United States Patent
Kano et al.

(10) Patent No.: US 12,444,509 B2
(45) Date of Patent: Oct. 14, 2025

(54) MEDICAL INFORMATION PROCESSING APPARATUS, AND MEDICAL INFORMATION LEARNING APPARATUS

(71) Applicant: Canon Medical Systems Corporation, Otawara (JP)

(72) Inventors: Yusuke Kano, Nasushiobara (JP); Yudai Yamazaki, Nasushiobara (JP)

(73) Assignee: Canon Medical Systems Corporation, Otawara (JP)

( * ) Notice: Subject to any disclaimer, the term of this patent is extended or adjusted under 35 U.S.C. 154(b) by 318 days.

(21) Appl. No.: 17/695,635

(22) Filed: Mar. 15, 2022

(65) Prior Publication Data

US 2022/0301726 A1    Sep. 22, 2022

(30) Foreign Application Priority Data

Mar. 19, 2021 (JP) .................................. 2021-046631
Mar. 10, 2022 (JP) .................................. 2022-037376

(51) Int. Cl.
*G16H 70/20* (2018.01)
*G16H 70/60* (2018.01)

(52) U.S. Cl.
CPC ............. *G16H 70/20* (2018.01); *G16H 70/60* (2018.01)

(58) Field of Classification Search
CPC ................................ G16H 70/20; G16H 70/60
See application file for complete search history.

(56) References Cited

U.S. PATENT DOCUMENTS

| | | | |
|---|---|---|---|
| 11,636,350 B1* | 4/2023 | Giannulli | G16H 10/60 706/45 |
| 11,875,901 B2* | 1/2024 | Lei | G16H 50/50 |
| 2018/0107798 A1 | 4/2018 | Hu | |
| 2019/0005395 A1 | 1/2019 | Dutkowski | |
| 2023/0343468 A1* | 10/2023 | Shapiro | G16H 50/70 |
| 2023/0377748 A1* | 11/2023 | Yang | G06N 3/08 |
| 2023/0386612 A1* | 11/2023 | Frings | G16H 50/70 |

FOREIGN PATENT DOCUMENTS

| | | |
|---|---|---|
| EP | 3 382 584 A1 | 10/2018 |
| JP | 2018-67303 A | 4/2018 |
| JP | 2018-170004 A | 11/2018 |
| JP | 2019-507444 A | 3/2019 |

* cited by examiner

*Primary Examiner* — Sheetal R Paulson
(74) *Attorney, Agent, or Firm* — Oblon, McClelland, Maier & Neustadt, L.L.P.

(57) ABSTRACT

A storage device stores a medical knowledge graph including nodes corresponding to medical care events, and edges indicative of a relationship between the nodes. A graph feature of the medical knowledge graph is expressed by a mathematical model characterized by patient background information. A processing circuitry obtains patient background information relating to a background factor of one or more target patients, computes variation of the graph feature relating to the target patient, based on the patient background information of the target patient and the mathematical model, and displays the variation of the graph feature on a display device.

9 Claims, 22 Drawing Sheets

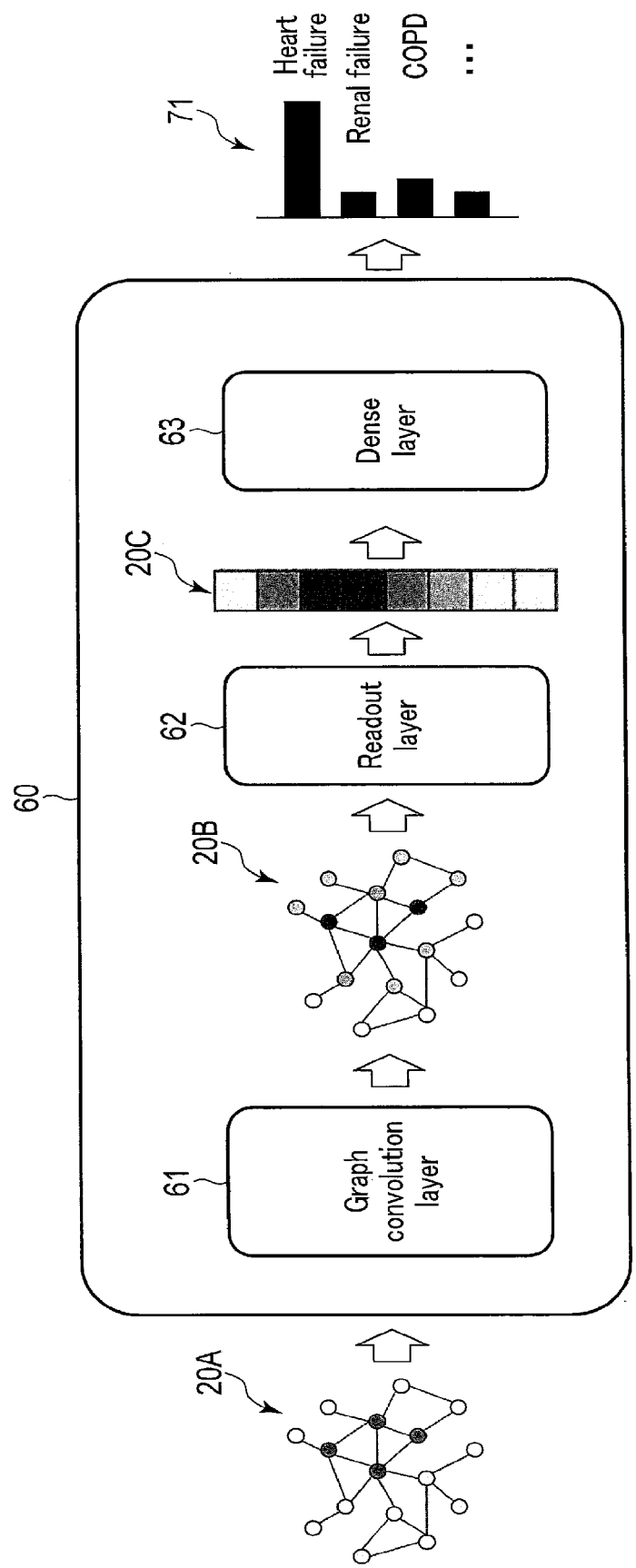
F I G. 6

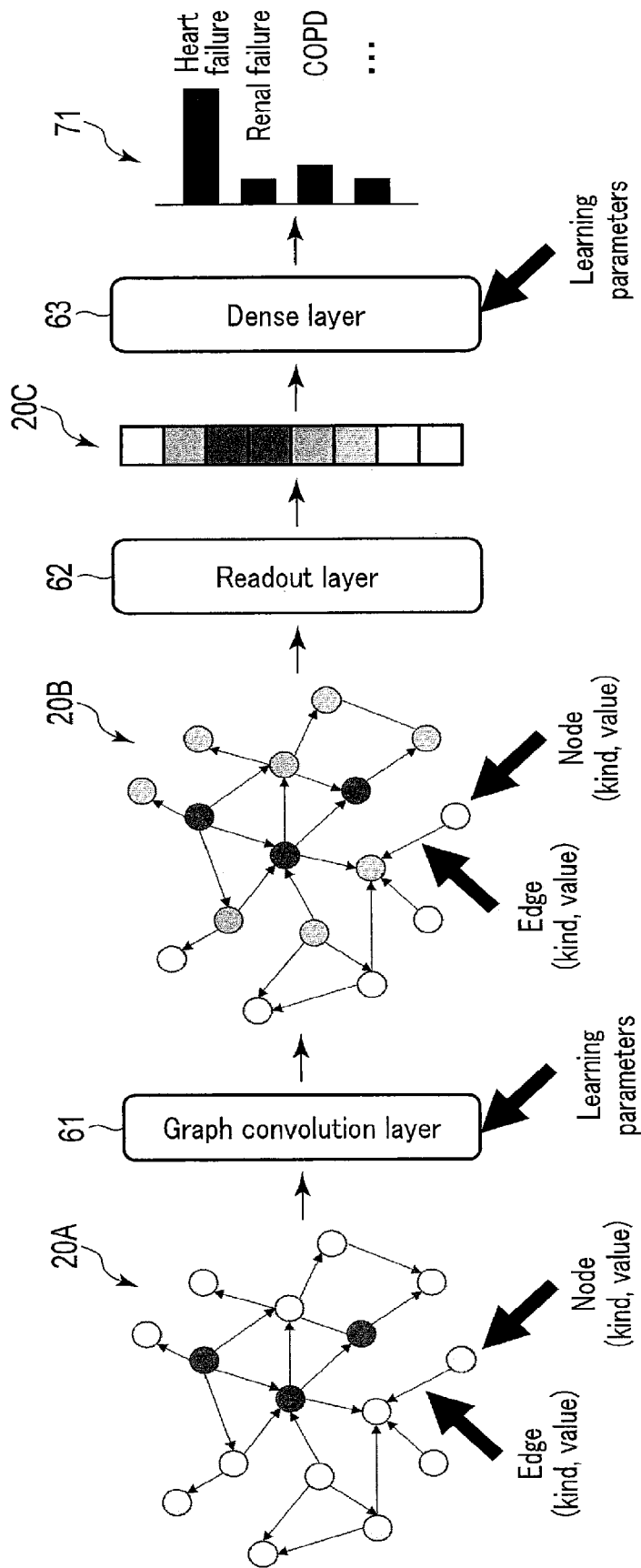
F I G. 7

Determination of edge $$\lambda_y(t) = \mu + \alpha_x \sum_{t_i \in E_x} \phi(t - t_i) + \alpha_y \sum_{t_i \in E_y} \phi(t - t_i)$$

Probability of occurrence of Y

Probability of occurrence of X in past

Probability of occurrence of Y in past $$\alpha_x = \sigma(W_x Z + b_x)$$

| Edge No. | Edge feature | Model parameters of mathematical model |
|---|---|---|
| 1 | e1 | Wx1<br>bx1 |
| 2 | e2 | Wx2<br>bx2 |
| 3 | e3 | Wx3<br>bx3 |
| ⋮ | ⋮ | ⋮ |

F I G. 12

| Node No. | Node feature | Model parameters of mathematical model |
|---|---|---|
| 1 | v1 | $\alpha v1, \beta v1, bv1$ |
| 2 | v2 | $\alpha v2, \beta v2, bv2$ |
| 3 | v3 | $\alpha v3, \beta v3, bv3$ |
| ⋮ | ⋮ | ⋮ |

F I G. 15

| Weight parameter No. | Weight parameter | Model parameters of mathematical model |
|---|---|---|
| 1 | w1 | $\alpha w1, \beta w1, bw1$ |
| 2 | w2 | $\alpha w2, \beta w2, bw2$ |
| 3 | w3 | $\alpha w3, \beta w3, bw3$ |
| ⋮ | ⋮ | ⋮ |

F I G. 16

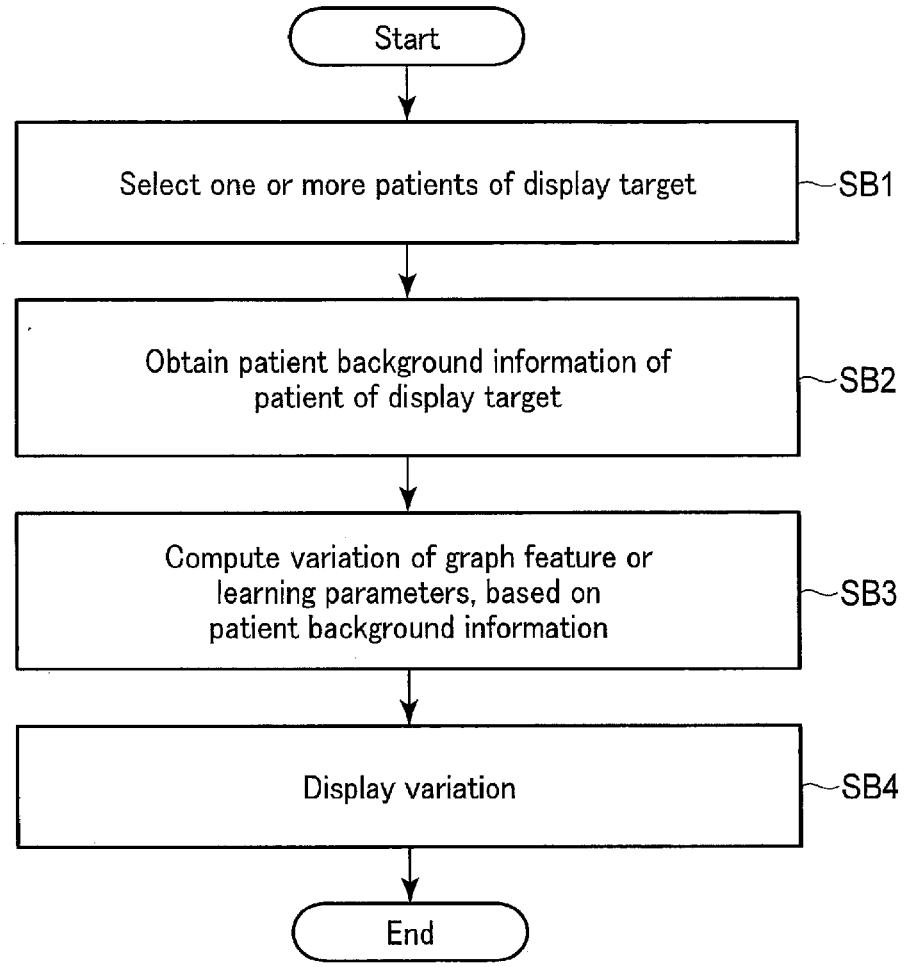
F I G. 18

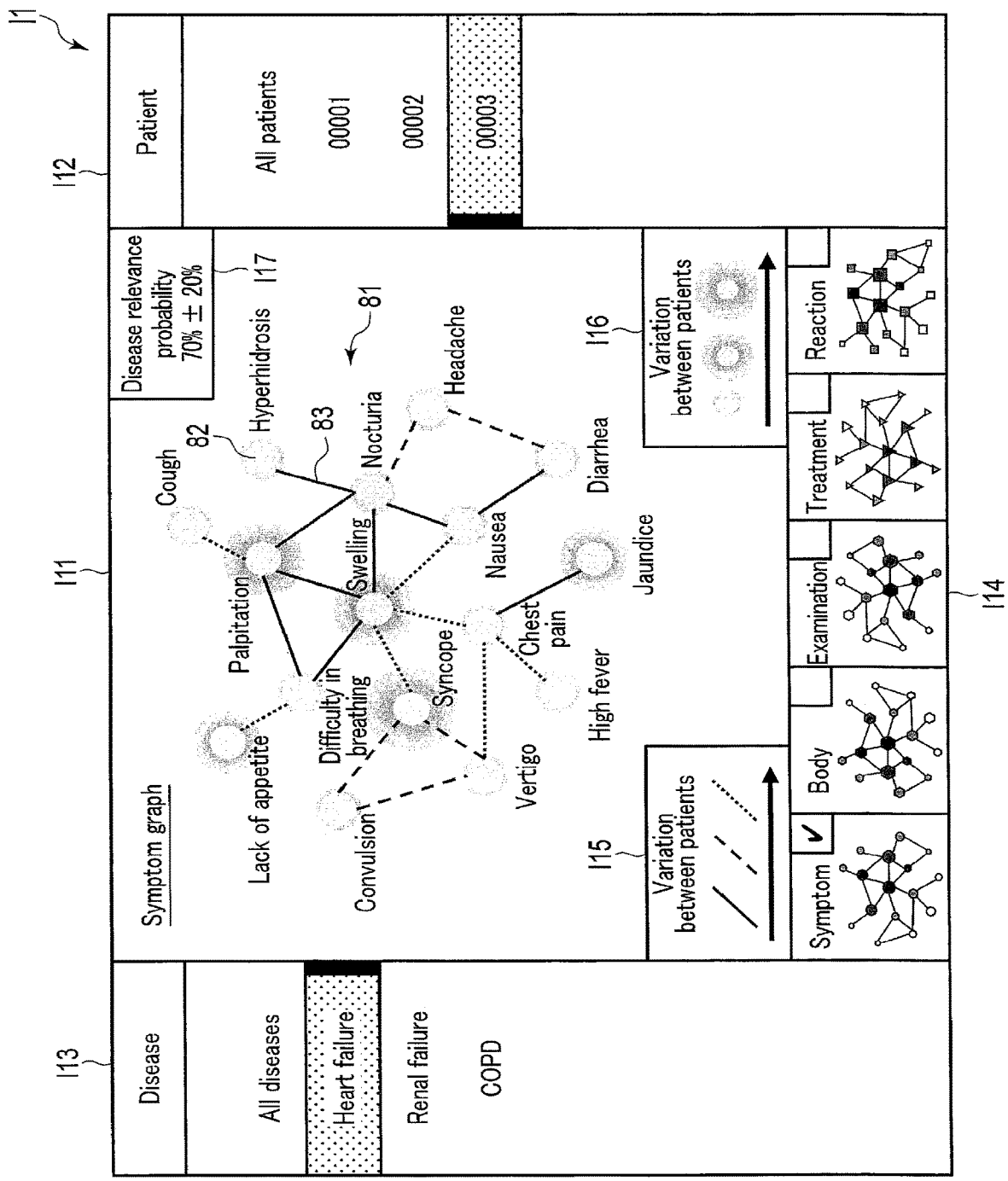
F I G. 19

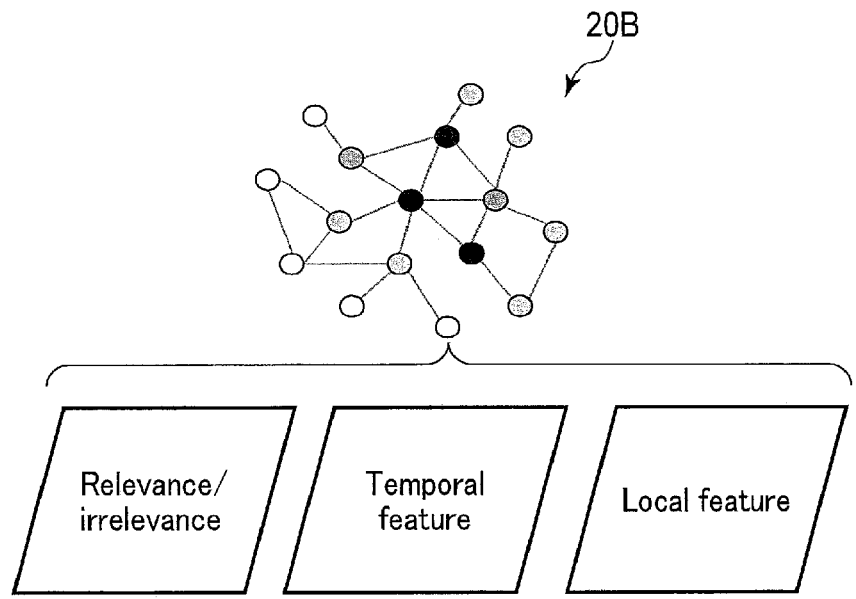
F I G. 23
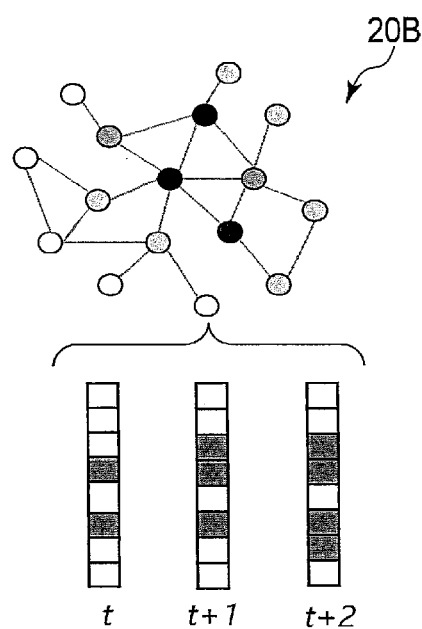
F I G 24

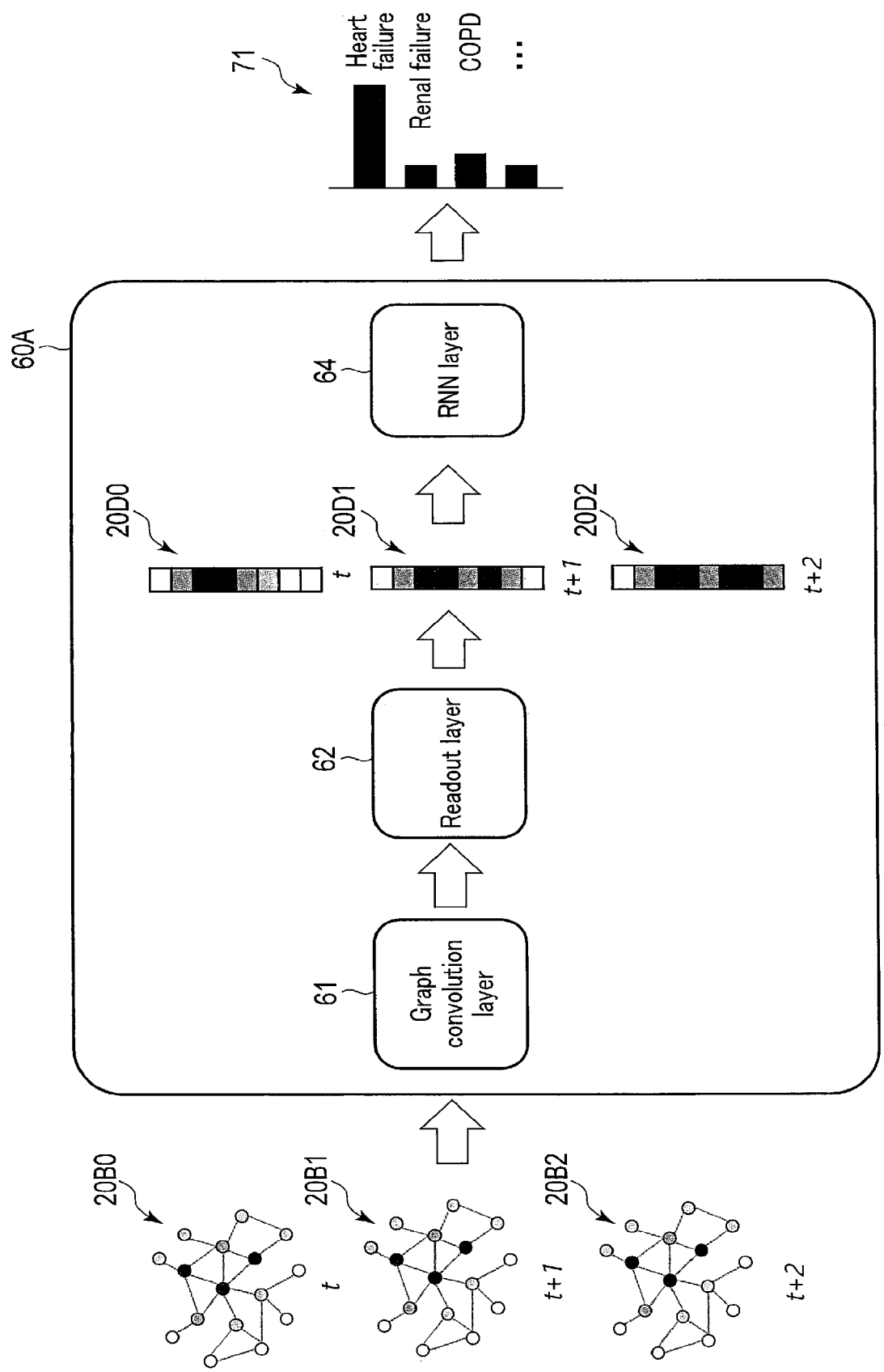
F I G. 25

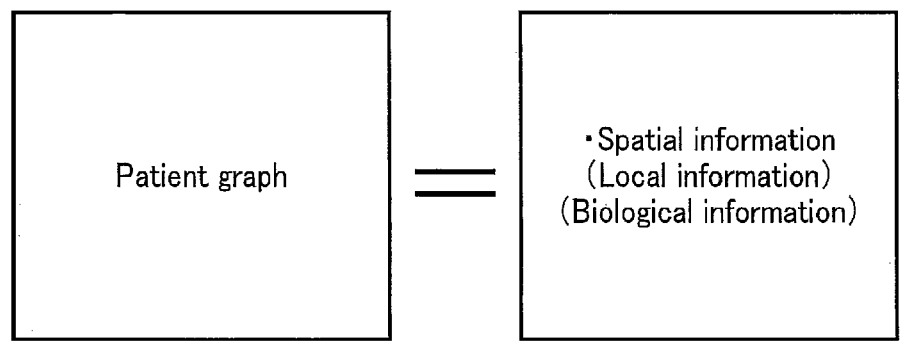
F I G. 26
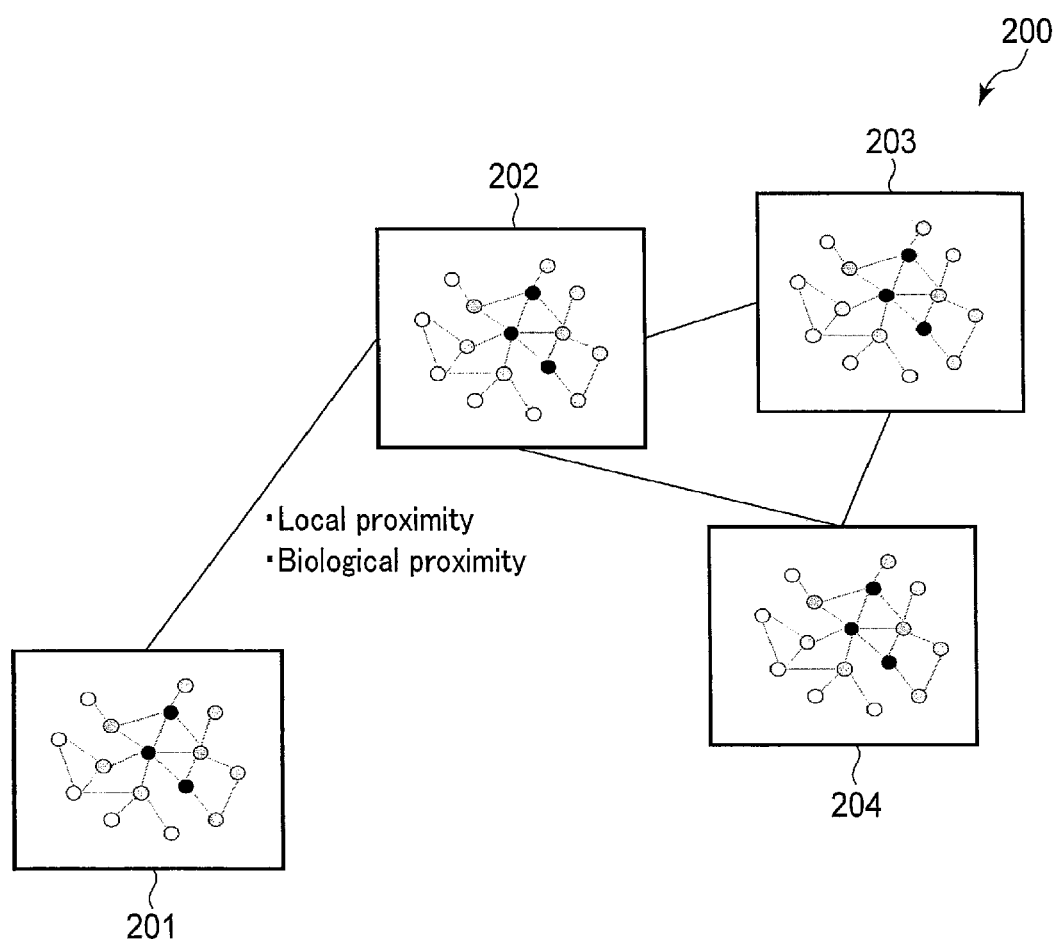
F I G. 27

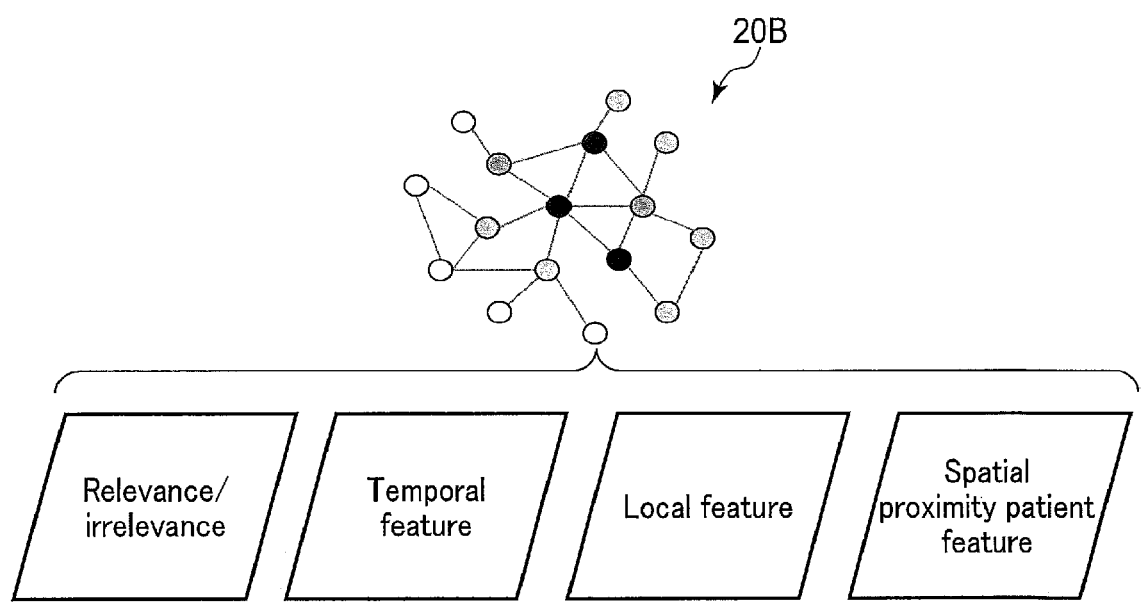
F I G. 28

MEDICAL INFORMATION PROCESSING APPARATUS, AND MEDICAL INFORMATION LEARNING APPARATUS

CROSS-REFERENCE TO RELATED APPLICATIONS

This application is based upon and claims the benefit of priority from Japanese Patent Application No. 2021-046631, filed Mar. 19, 2021; and No. 2022-037376, filed Mar. 10, 2022; the entire contents of all of which are incorporated herein by reference.

FIELD

Embodiments described herein relate generally to a medical information processing apparatus, and a medical information learning apparatus.

BACKGROUND

By constructing a database by systematizing classifications of diseases and a relationship between diseases as medical knowledge, it can be expected to utilize the database for the understanding of complex diseases, the discovery of research hypotheses, medical care support, and the like. For example, in the field of medicine, the development of medical ontology, such as ICD-10 that is a classification system of diseases, or SNOMED-CT that describes semantic relations between medical terms, has been in progress. In addition, in recent years, attention has been paid to a data analysis method using a graph structure that can express a relationship between medical care events.

While the medical ontology and graph structure can express a relationship between medical care events, it is not always possible to explain different events between patients, by using the same structure.

BRIEF DESCRIPTION OF THE DRAWINGS

FIG. 6 is a view illustrating an input and an output of a machine learning model according to the present embodiment.

FIG. 7 is a view illustrating elements with variation among the elements involved in the machine learning model according to the present embodiment.

FIG. 12 is a view illustrating an example of an edge feature DB.

FIG. 15 is a view illustrating an example of a node feature DB.

FIG. 16 is a view illustrating an example of a weight parameter DB.

FIG. 18 is a view illustrating a flow of a variation display process by the medical information processing apparatus illustrated in FIG. 17.

FIG. 19 is a view illustrating an example of a display screen of variation displayed in step SB4 in FIG. 18.

FIG. 23 is a view representing an outline of graph features according to Applied Example 1.

FIG. 24 is a view representing an outline of a graph feature according to Applied Example 2.

FIG. 25 is a view illustrating an example of an estimation process of medical judgment information according to Applied Example 2.

FIG. 26 is a view schematically illustrating a relationship between a patient graph and spatial information according to Applied Example 4.

FIG. 27 is a view illustrating a concept of a patient graph network according to Applied Example 4.

FIG. 28 is a view representing an outline of graph features according to Applied Example 5.

DETAILED DESCRIPTION

A medical information processing apparatus according to an embodiment includes a storage device and processing circuitry. The storage device stores a medical knowledge graph including nodes corresponding to medical care events, and edges indicative of a relationship between the nodes. A graph feature of the medical knowledge graph is expressed by a mathematical model characterized by patient background information. The processing circuitry obtains patient background information relating to a background factor of one or more target patients, computes variation of the graph feature relating to the target patient, based on the patient background information of the target patient and the mathematical model, and displays the variation of the graph feature on a display device.

Hereinafter, referring to the accompanying drawings, embodiments of a medical information processing apparatus and a medical information learning apparatus will be described in detail.

Figure 1:
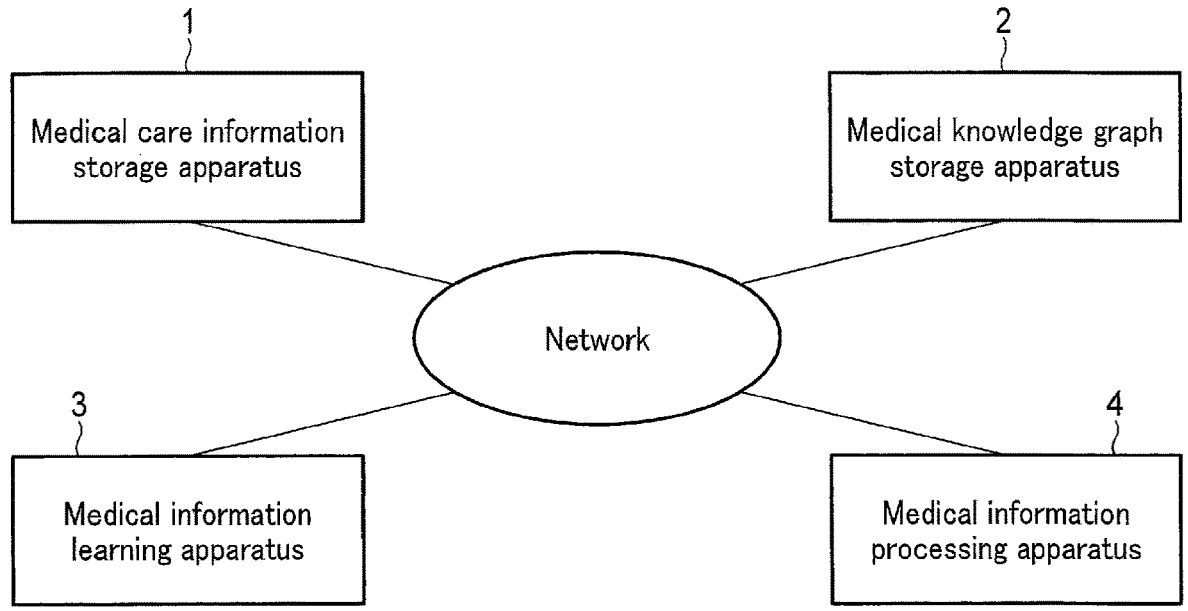
FIG. 1 is a view illustrating a configuration example of a medical information system according to an embodiment.

FIG. 1 is a view illustrating a configuration example of a medical information system 100 according to an embodiment. The medical information system 100 is a computer network system including a medical care information storage apparatus 1, a medical knowledge graph storage apparatus 2, a medical information learning apparatus 3, and a medical information processing apparatus 4. The medical care information storage apparatus 1, medical knowledge graph storage apparatus 2, medical information learning apparatus 3 and medical information processing apparatus 4 are mutually communicably connected to a network.

The medical care information storage apparatus 1 is a computer including a storage device that stores medical care information or the like of a plurality of patients. The medical knowledge graph storage apparatus 2 is a computer including a storage device that stores a medical knowledge graph or the like. The medical knowledge graph is expressed by a graph structure that is generated based on medical care information of a plurality of patients, and medical knowledge such as medical ontology. Hereinafter, it is presupposed that the medical knowledge graph is a graph. The medical information learning apparatus 3 is a computer that trains a machine learning model which estimates medical judgment information by using the medical knowledge graph. In addition, the medical information learning apparatus 3 trains a mathematical model that defines the graph feature of the medical knowledge graph. The medical information processing apparatus 4 is a computer that computes and presents variation of the graph feature or the like between patients.

Figure 2:
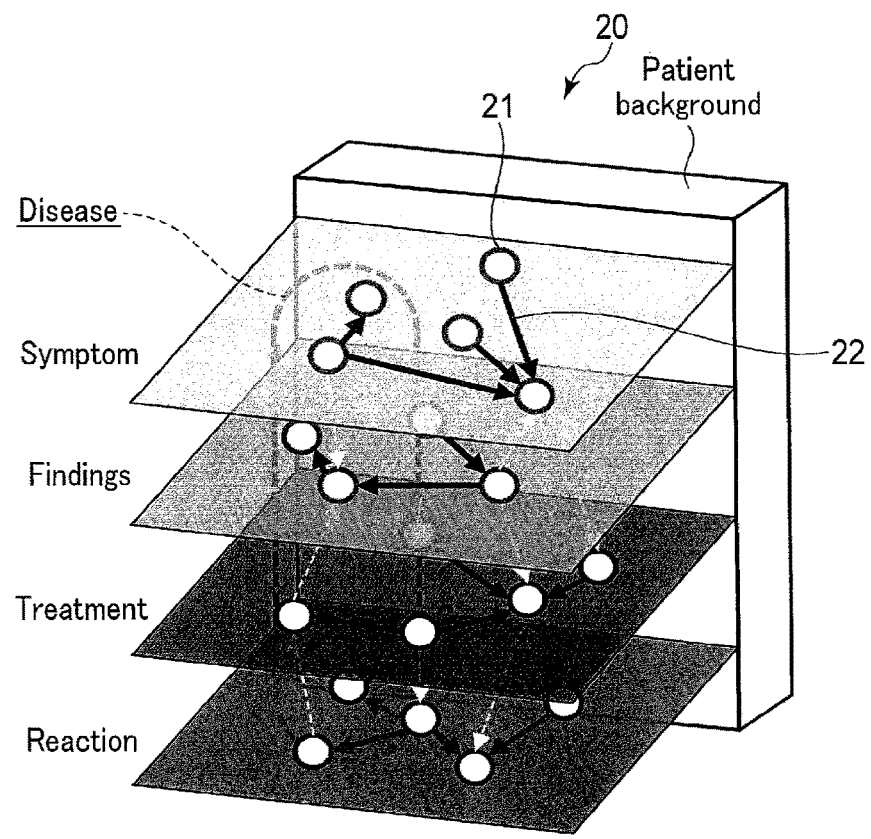
FIG. 2 is a conceptual view of a medical knowledge graph.

FIG. 2 is a conceptual view of a medical knowledge graph 20. The medical knowledge graph 20 is a graph in which medical knowledge and medical care information of patients are integrated. The medical care information is information generated by medical care for certain patients. The medical care information is classified into information relating to medical care events (hereinafter referred to as "medical care event information"), information relating to diseases (hereinafter "disease information"), and information relating to background factors of patients (hereinafter "patient background information"). The kinds of the medical care events are classified into, for example, four categories, i.e. a symptom, findings, a treatment and a reaction. The symptom is a change in mind and body occurring due to a disease. Specifically, the kinds of the medical care events relating to the symptom are, for example, swelling, palpitation, and difficulty in breathing. The findings are a doctor's judgment on the symptom. The findings may be further classified into a category of a physical finding and a category of an examination finding. The treatment is medical practice for curing or relieving the symptom. The kinds of the medical care events relating to the treatment are, for example, the administration of cardiotonic, CRT-embedding surgery, and the like. The reaction is a reaction of the mind and body of the patient to the treatment. The reaction may be further classified into a category of a treatment reaction and a category of a side effect. The kinds of the medical care events relating to the reaction are, for example, the presence of diuresis of 40 mL/h or more, or the presence of electrolyte abnormality, in connection with the administration of a diuretic drug. The disease information is information of the name or symbol relating to a disease to which the patient is relevant. The patient background information broadly influence most of a patient's medical care information or act as an interaction term for relationships among medical care information. The medical care information and the patient background information may be assigned based on the presence or absence of time information and the frequency of change. The patient background information typically has no time information. Examples of patient background factors, which are factors of the patient background information that has no time information, include a gender, a body height, a body weight, BMI, a lifestyle, a medical history, and a surgical history.

The medical care information is collected by various hospital information systems, such as HIS (Hospital Information System), RIS (Radiology Information System), and PACS (Picture Archiving and Communication System). Each piece of the medical care event information and disease information included in the medical care information is correlated with the date of occurrence of the information.

As illustrated in FIG. 2, the medical knowledge graph 20 is a graph constituted by a plurality of nodes 21 and a plurality of edges 22. The nodes 21 correspond to medical care events. The edges 22 indicate the relationship between the nodes 21. Specifically, the edges 22 indicate the relationship between the medical care events corresponding to the connected nodes 21. The relationship between the medical care events means the cause-and-effect relation or the correlation between the medical care events. The cause-and-effect relation means the relation between the cause and effect, which exists between the medical care events, and the correlation means a relationship without a cause-and-effect relation. Specifically, the edge 22 indicative of the cause-and-effect relation is directed, and the edge 22 indicative of the correlation is undirected. The edge 22 can connect medical care events belonging to different categories. The medical care events used in the medical knowledge graph 20 are selected from the medical care information that is stored in the medical care information storage apparatus 1, based on the medical knowledge, medical ontology, and the like. The relationship between one medical care event and another medical care event is analyzed based on the medical knowledge, medical ontology, and the like, and, when the relationship is recognized, two nodes 21 corresponding to these two medical care events are connected by the edge 22.

The medical knowledge graph 20 does not include a node corresponding to a medical care event that is a disease. A certain specific disease is extracted from a set of a series of medical care events of the symptom, findings, treatment and reaction occurring in a target patient. In other words, the medical knowledge graph 20 expresses an individual disease by a chain of relationships of the series of medical care events of the symptom, findings, treatment and reaction. It can also be said that the medical knowledge graph 20 is a graph representing concepts of diseases, which describes the chain of relationships of the series of medical care events of the symptom, finding, treatment and reaction.

Figure 3:
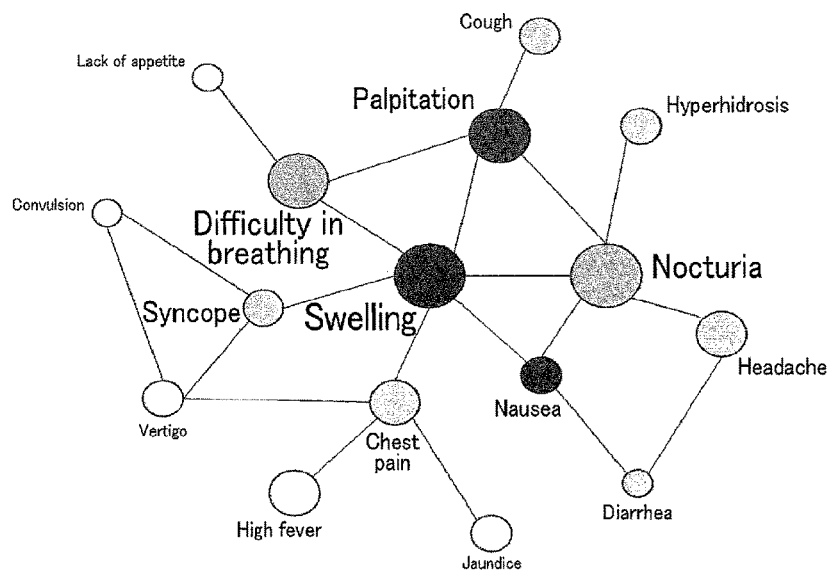
FIG. 3 is a view illustrating a concrete example of the medical knowledge graph.

FIG. 3 is a view illustrating a concrete example of the medical knowledge graph. The medical knowledge graph illustrated in FIG. 3 is a graph in which the medical care event information of the target patient is mapped on the medical knowledge graph. The medical knowledge graph, on which the medical care event information of the target patient is mapped, is also called "patient graph". By way of example, the medical knowledge graph illustrated in FIG. 3 is a symptom graph which is limited to medical care events belonging to the symptom category. As illustrated in FIG. 3, the symptom graph represents a graph including nodes indicative of symptoms, and edges indicative of a relationship between the symptoms. The density of colors of nodes is indicative of the degree of relevance of the target patient to the medical care events. In this manner, the medical knowledge graph describes a chain of relationships of a series of medical care events occurring in the parget patient, and, from the chain of relationships of the series of medical care events, a medical judgment of a disease or the like, which the target patient may possibly contract, can be obtained.

Even in the case of the same disease, the presence/absence or the strength/weakness of the relationship between the medical care events varies depending on backgrounds of individual patients. Even if the disease of the patient is estimated without considering the patient background, a proper result cannot always be obtained.

Figure 4:
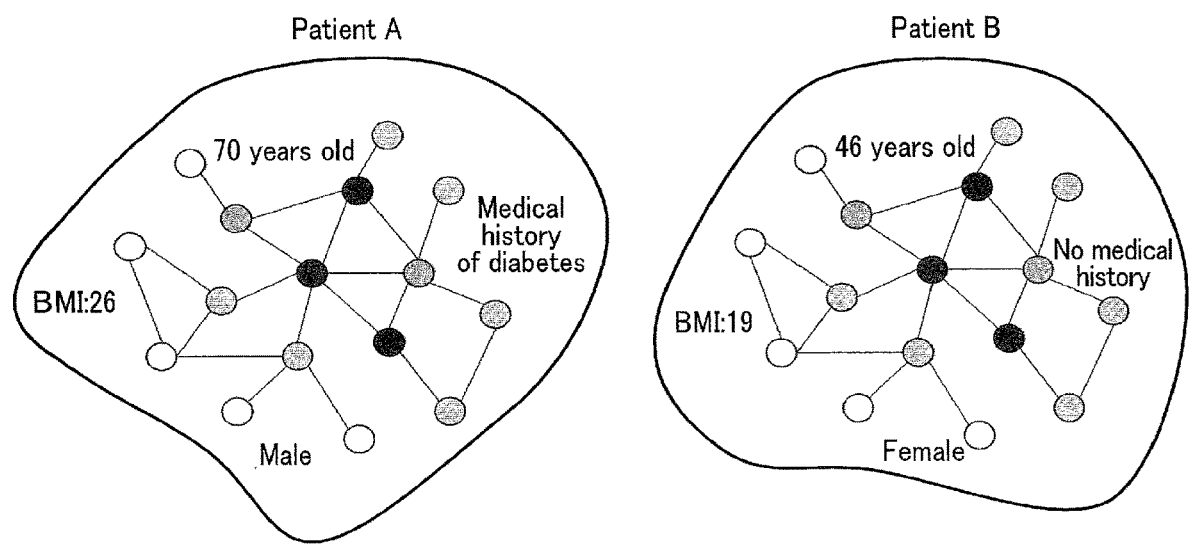
FIG. 4 is a view illustrating a concept of a relationship between a patient background and a patient graph.

FIG. 4 is a view illustrating a concept of a relationship between a patient background and a patient graph. As illustrated in FIG. 4, unlike the node and the edge, the patient background influences the entirety of the patient graph. Even when identical patient graphs are constructed for a patient A and a patient B, there is a case in which the patient background, such as the gender, age, BMI or medical history, is different. In this manner, even if the patient A and the patient B have the same patient graph, if the patient background is different, there must be room for making it possible to derive different medical judgments from the graphs of both patients. This means that a part of nodes and/or edges of the patient graph is modified and varied by the patient graph being placed in the contest of the patient background. The medical information system 100 according to the present embodiment presents a degree of modification between different patient backgrounds as variation.

Figure 5:
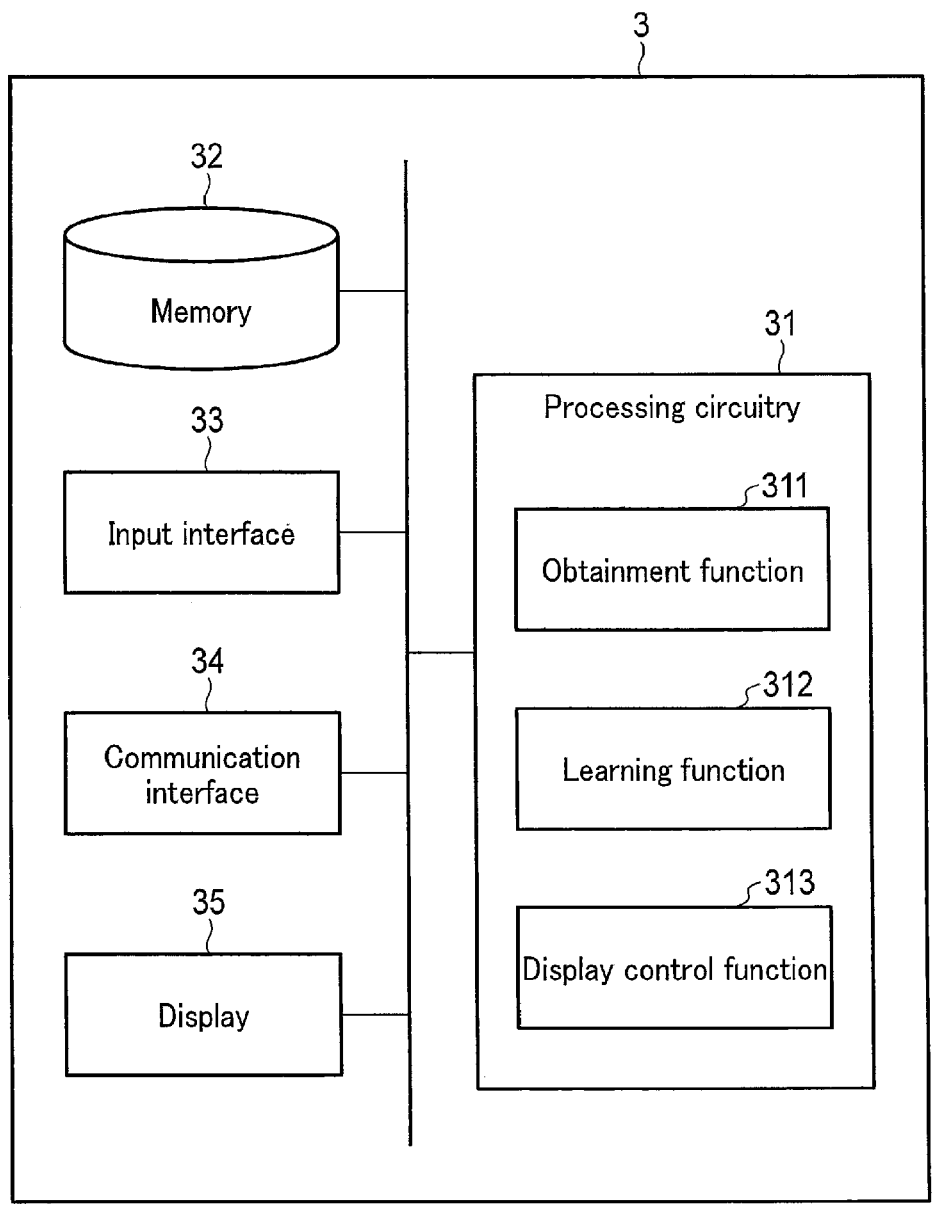
FIG. 5 is a view illustrating a configuration example of a medical information learning apparatus illustrated in FIG. 1.

FIG. 5 is a view illustrating a configuration example of a medical information learning apparatus 3 according to the present embodiment. As illustrated in FIG. 5, the medical information learning apparatus 3 includes processing circuitry 31, a memory 32, an input interface 33, a communication interface 34 and a display 35.

The processing circuitry 31 includes processors such as a CPU (Central Processing Unit) and a GPU (Graphics Processing Unit). The processing circuitry 31 implements an obtainment function 311, a learning function 312 and a display control function 313, by executing a learning program. Note that the functions 311 to 313 may not be implemented by single processing circuitry. A plurality of independent processors may be combined to constitute processing circuitry, and the processors may implement the functions 311 to 313 by executing programs. Besides, the functions 311 to 313 may be modularized programs that constitute a learning program, or may be individual programs. The programs are stored in the memory 32.

By implementing the obtainment function 311, the processing circuitry 31 obtains various information. For example, the processing circuitry 31 obtains, from the medical care information storage apparatus 1, patient background information relating to background factors of a plurality of patients. In addition, the processing circuitry 31 obtains a medical knowledge graph from the medical knowledge graph storage apparatus 2. As described above, the medical knowledge graph includes nodes corresponding to medical care events and edges representing the relationship between the nodes. The graph feature of the medical knowledge graph is characterized by a mathematical model including patient background information.

By implementing the learning function 312, the processing circuitry 31 determines, based on the patient background information of patients and a mathematical model, parameters of the mathematical model. In addition, the processing circuitry 31 trains learning parameters of a machine learning model that estimates medical judgment information from the medical knowledge graph. The learning parameters are characterized by the mathematical model including the patient background information. The processing circuitry 31 determines the parameters of the mathematical model, based on the patient background information of patients and the mathematical model, as well as the learning parameters. The processing circuitry 31 determines the parameters of the mathematical model by statistical analysis or machine learning, which is based on the patient background information of patients.

By implementing the display control function 313, the processing circuitry 31 displays various information on the display 35.

The memory 32 is a storage device storing various kinds of information, such as a ROM (Read Only Memory), a RAM (Random Access Memory), an HDD (Hard Disk Drive), an SSD (Solid State Drive), an integrated-circuit storage device, or the like. Aside from the above storage device, the memory 32 may be a drive unit that reads/writes various kinds of information from/to a portable storage medium such as a CD (Compact Disc), a DVD (Digital Versatile Disc) or a flash memory, or a semiconductor memory device. In addition, the memory 32 may be provided in another computer that is connected to the medical information learning apparatus 3 via a network. For example, the memory 32 stores the medical knowledge graph obtained from the medical knowledge graph storage apparatus 2. Furthermore, the memory 32 stores a machine learning model.

The input interface 33 accepts various input operations from an operator, converts the accepted input operations to electric signals, and outputs the electric signals to the processing circuitry 31. Specifically, the input interface 33 is connected to input devices such as a mouse, a keyboard, a trackball, a switch, a button, a joystick, a touch pad, and a touch-panel display. The input interface 33 outputs an electric signal, which corresponds to an input operation to the input device, to the processing circuitry 31. In addition, the input device connected to the input interface 33 may be an input device provided in another computer that is connected via a network or the like.

The communication interface 34 is an interface for transmitting/receiving various information to/from other computers such as the medical care information storage apparatus 1, medical knowledge graph storage apparatus 2 and medical information processing apparatus 4 included in the medical information system 100.

The display 35 displays various information in accordance with the display control function 313 of the processing circuitry 31. As the display 35, for example, use can be made of, as appropriate, a liquid crystal display (LCD), a CRT (Cathode Ray Tube) display, an organic electro-luminescence (EL) display (OLED), a plasma display, or some other freely chosen display. Furthermore, a projector may be provided in place of, or in combination with, the display 35.

Next, a learning process, which is executed by the processing circuitry 31 according to a learning program, is described. To begin with, a machine learning model used in the learning process is described.

The machine learning model according to the present embodiment is a neural network that estimates, from a patient graph on which medical care event information of a target patient is mapped, medical judgment information of the target patient. The medical judgment information is information relating to at least one medical judgment among disease classification information, prognosis estimation information, and severity level classification information. In the embodiment below, it is assumed that the medical judgment information is the disease classification information.

FIG. 6 is a view illustrating an input and an output of a machine learning model according to the present embodiment. As illustrated in FIG. 6, the machine learning model is a neural network which inputs therein a patient graph on which medical care event information of the target patient is mapped, and in which the learning parameters are trained so as to output disease classification information. The machine learning model includes a graph convolution layer 61, a readout layer 62 and a dense layer 63.

The patient graph is generated by mapping the medical care event information of the target patient on the medical knowledge graph. The medical care event information is information including a combination between the kinds of medical care events and the features of the medical care events. The feature of the medical care event includes, for example, at least one kind among a degree of relevance of the target patient to the medical care event, an order of occurrence of the medical care event, a count of occurrences of the medical care event, and a degree of occurrence of the medical care event. Note that the degree of relevance is typically defined by a binary value indicative of relevance or irrelevance. However, the degree of relevance may be defined by three or more discrete values or sequential values indicating the degree of relevance.

As described above, the medical knowledge graph is a graph constituted by a plurality of nodes and a plurality of edges. The medical knowledge graph includes graph features. The graph features include a kind of a node, a value of a node, a kind of an edge, and a value of an edge. The kind of the node is a kind or a category of the medical care event. The value of the node is a feature of the medical care event mapped on the node. In other words, the value of the node is the degree of relevance of the target patient to the medical care event, the order of occurrence of the medical care event, the count of occurrences of the medical care event, and the degree of occurrence of the medical care event. The kind and value of the node are comprehensively referred to as "node feature". The kind of the edge is a combination of a cause-and-effect direction (in the case of a directed graph) and the kind of two nodes that are connected by the edge. The value of the edge is a degree of causality or correlation. The degree of causality or correlation is typically defined by a binary value indicative of presence ("directed") or absence ("undirected"), but may be defined by three or more discrete values or sequential values indicating the degree of causality or correlation. The kind and value of the edge are comprehensively referred to as "edge feature". Since the patient graph is a graph in which the medical care event information is mapped on the medical knowledge graph, the patient graph has graph features.

In the present embodiment, the "kind" and the "value" do not need to be clearly distinguished. For example, the value of the node or edge may be compared with a threshold, and may be classified into the kind or category.

The graph convolution layer 61 is a graph convolutional network (GCN) that inputs therein a patient graph before convolution and outputs a patient graph after convolution. The graph convolution layer 61 executes a graph convolution process on the patient graph before convolution, and computes a graph feature after convolution from a graph feature before convolution. The graph feature after convolution of a process-target node is computed based on the graph feature before convolution of the process-target node, the graph feature before convolution of a node (hereinafter referred to "adjacent node") that is connected to the process-target node via an edge, and a weight parameter of the graph convolution layer 61. The weight parameter of the graph convolution layer 61 is an example of learning parameters that are trained by the medical information learning apparatus 3.

The readout layer 62 is a network layer that converts the graph feature of the patient graph 20B after convolution to a feature vector 20C. The feature vector 20C is a vector having the same number of dimensions as the number of nodes included in the patient graph 20B after convolution.

The dense layer 63 is a network layer that converts the feature vector 20C to disease classification information 71. The dense layer 63 is also called "multilayer perceptron (MLP)". The dense layer 63 executes a class classification task or a regression task. The class classification task may be a 2-class classification for determining the presence/absence of the relevant disease, or a multi-class classification for specifying one disease from a plurality of disease candidates. The class classification task may be a multi-label classification which allows a plurality of labels for an identical data set. The regression task outputs a numerical value indicative of the probability of relevance to each of one or more relevant diseases. The dense layer 63 is also referred to as fully-connected layer, linear layer, or multi-layer perceptron (MLP).

In the present embodiment, the dense layer 63 includes a classifier that executes multi-class classification for classifying the feature vector 20C into a plurality of classes corresponding to a plurality of diseases, respectively. In the multi-class classification, an operation of a softmax function, which outputs the probability that the feature vector 20C belongs to each disease (class), is executed. The probability that the feature vector 20C belongs to each disease is output as the disease classification information 71. For example, as illustrated in FIG. 6, the probability of relevance to the disease "heart failure", the probability of relevance to the disease "renal failure", the probability of relevance to the disease "COPD", and the like are output as the disease classification information 71. The relevance probability of each disease in the disease classification information 71 is computed based on the feature vector 20C after convolution and the weight parameter of the dense layer 63. The weight parameter of the dense layer 63 is an example of learning parameters that are trained by the medical information learning apparatus 3.

Variation due to a difference in patient background between patients also appears in the estimation process of disease classification information using the machine learning model illustrated in FIG. 6.

FIG. 7 is a view illustrating elements with variation among the elements involved in the machine learning model according to the present embodiment. As illustrated in FIG. 7, elements with variation are graph features including the kind of a node, the value of a node, the kind of an edge, and the value of an edge. For example, although the node features, such as the kind of the node and the value of the node, are values based on medical care events, the presence/absence and the degree of occurrence of the medical care events are actually affected by the patient background. Owing to this, the edge features, such as the kind of the edge and the value of the edge, are also affected by the patient background. Other elements with variation include the weight parameter of the graph convolution layer 61 and the weight parameter of the dense layer 63.

Figure 8:
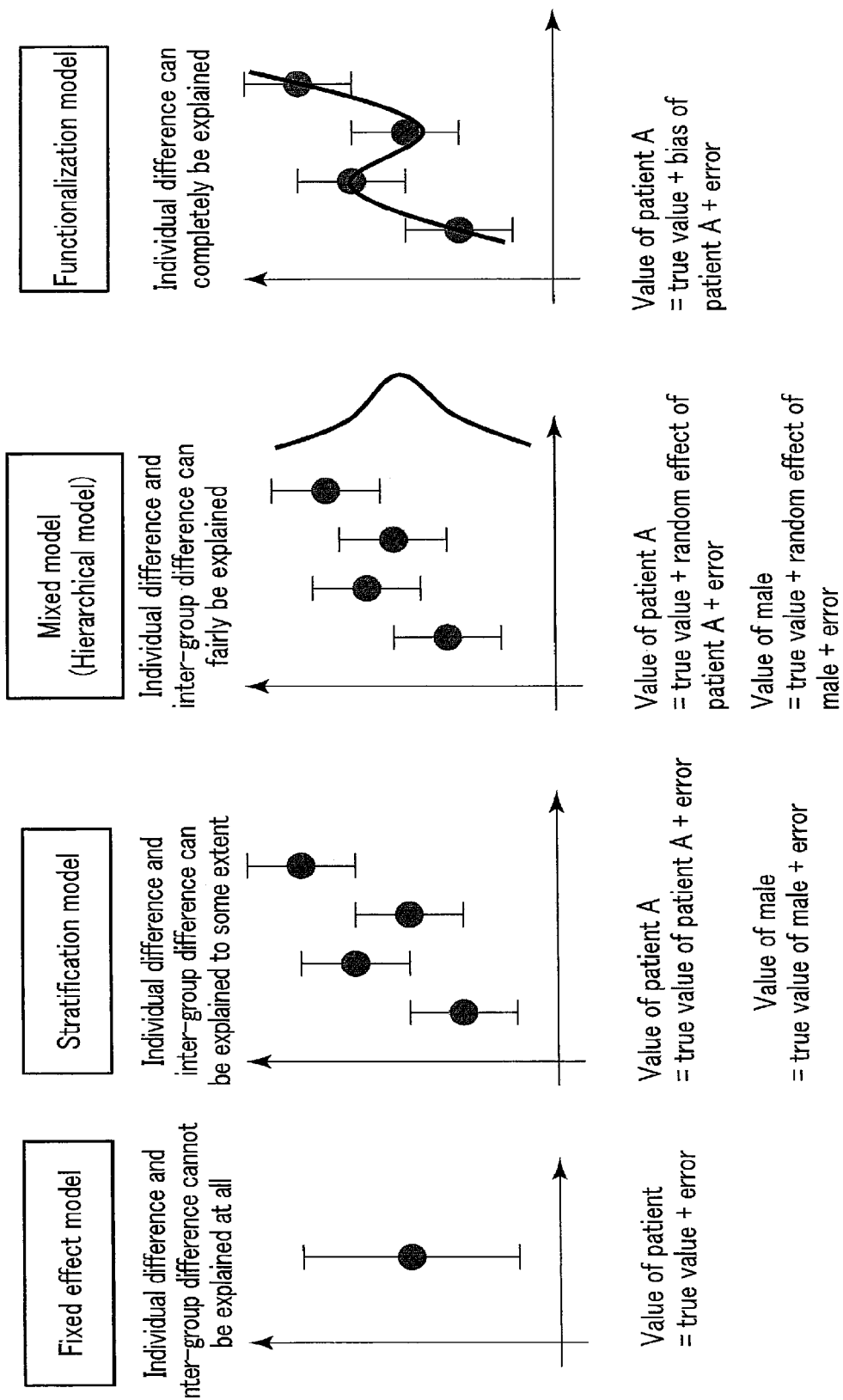
FIG. 8 is a view illustrating types of a mathematical model representing variation.

FIG. 8 is a view illustrating types of a mathematical model representing variation. As illustrated in FIG. 8, mathematical models representing variation are a fixed effect model, a stratification model, a hierarchical model and a functionalization model. The fixed effect model does not distinguish individual patients, and expresses the value of a patient by "value of patient=true value+error". The fixed effect model cannot explain an individual difference and inter-group difference at all. The stratification model is a mathematical model that is stratified by patient background information relating to one or more background factors. The stratification model distinguishes individual patients, expresses the value of a patient A by "value of patient A=true value of patient A+error", and expresses the value of a male patient group (hereinafter simply referred to as "male") by "value of male=true value of male+error". Note that "value" means a value in which variation occurs, such as the value of the graph feature or the value of the weight parameter. The stratification model can explain the individual difference and inter-group difference to some extent. The mixed model is a mathematical model based on a random effect by patient background information relating to one or more background factors. The mixed model is also called "hierarchical model". The mixed model expresses the value of a patient A by "value of patient A=true value+random effect of patient A+error", and expresses the value of male by "value of male=true value+random effect of male+error". The mixed model can fairly explain the individual difference and inter-group difference. The functionalization model is a mathematical model based on a function with a value uniquely determined by patient background information relating to one or more background factors. The functionalization model expresses the value of a patient A by "value of patient A=true value+bias of patient A+error". The functionalization model can completely explain the individual difference.

Next, a learning process executed by the processing circuitry 31 according to a learning program is described.

Figure 9:
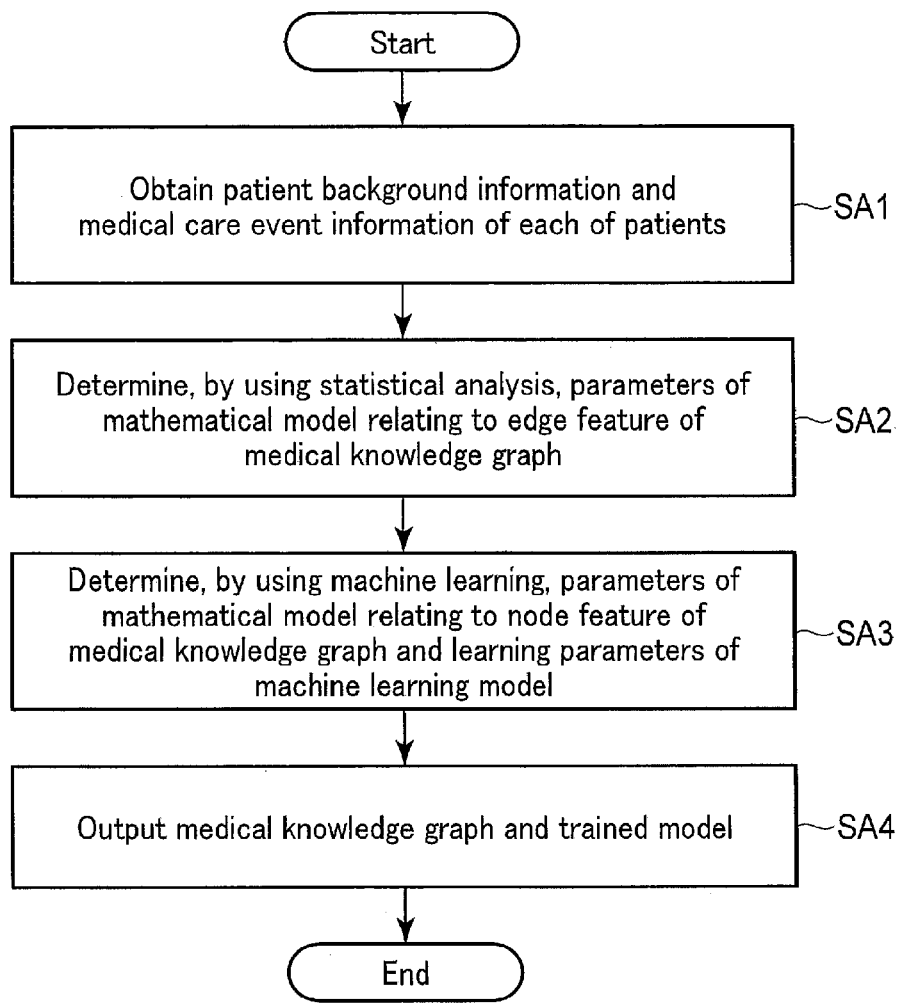
FIG. 9 is a view illustrating a flow of a learning process by the medical information learning apparatus illustrated in FIG. 5.

FIG. 9 is a view illustrating a flow of the learning process. As illustrated in FIG. 9, by implementing the obtainment function 311, the processing circuitry 31 obtains patient background information and medical care event information of each of patients (step SA1).

If step SA1 is executed, the processing circuitry 31 determines, by implementing the learning function 312, parameters of the mathematical model relating to the edge feature of the medical knowledge graph by using statistical analysis based on the patient background information, the medical care event information and the mathematical model (step SA2). The mathematical model according to the present embodiment is represented by one of a stratification model, a mixed mode (hierarchical model) and a functionalization model.

Figure 10:
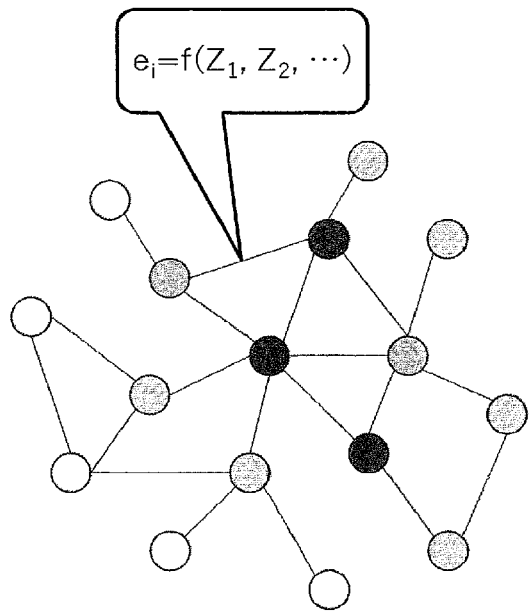
FIG. 10 is a view illustrating an outline of a mathematical model relating to an edge feature relating to step SA2 in FIG. 9.

FIG. 10 is a view illustrating an outline of the mathematical model relating to the edge feature. As illustrated in FIG. 10, an edge feature $e_i$ is, as indicated by equation (1) below, generalized by a mathematical model f in which patient background information Z is an explanatory variable. The patient background information Z includes patient background factors $Z_1, Z_2 \ldots$. The respective patient background factors are, for example, an age, a gender, BMI, and the like.

$$e_i = f(Z_1, Z_2, \ldots) \tag{1}$$

Here, it is assumed that the mathematical model f is represented by the functionalization model. In this case, the mathematical model f is composed of a combination between a fixed effect term that does not depend on the patient background information, and a random effect term that is characterized by the patient background factors.

As a statistical analysis method for determining the parameters of the mathematical model relating to the edge feature, use is made of variance analysis, Granger causality estimation, or causality effect estimation. By way of example, a determination method of model parameters by Granger causality estimation is described.

Figure 11:
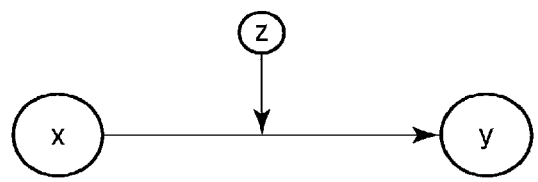
FIG. 11 is a view schematically illustrating a determination process of an edge feature using Granger causality estimation in step SA2 in FIG. 9.

FIG. 11 is a view schematically illustrating a determination process of an edge feature using Granger causality estimation. As illustrated in FIG. 11, the causality from a medical care event x to a medical care event y can be expressed by an edge from the medical care event x to the medical care event y in a directed graph. Here, the determination of an edge feature of the edge from the medical care event x to the medical care event y, for example, the presence/absence of the edge, is assumed. It is supposed that the causality from the medical care event x to the medical care event y is affected by a patient background factor z. Note that the medical care events x and y are replaced with the kinds of concrete medical care events such as "swelling" and "difficulty in breathing".

The present probability of occurrence of the medical care event y is determined based on the probability of occurrence of the medical care event x in the past and the probability of occurrence of the medical care event y in the past. To be more specific, as illustrated in FIG. 11 and indicated in equation (2) below, a present probability of occurrence of the medical care event y, $\lambda_y(t)$, is determined based on the sum of an error term p, a second term representing the probability of occurrence of the medical care event x in the past, and a third term representing the probability of occurrence of the medical care event y in the past. Here, $t_i$ is the medical care event, and i indicates an index of the medical care event. In the second term, Ex indicates a set (sample space) of the medical care events x. In the second term, $t_i \in$ Ex means a time of occurrence of each medical care event x. In the third term, Ey indicates a set (sample space) of the medical care events y. In the third term, $t_i \in$ Ey means a time of occurrence of each medical care event y, and $\varphi(t-t_i)$ represents the probability of occurrence of the medical care event in the past $t-t_i$. In other words, the second term represents the probability of occurrence of the medical care event x in the past, and the third term represents the probability of occurrence of the medical care event y in the past.

$$\lambda_y(t) = \mu + \alpha_x \sum_{t_i \in E_x} \phi(t-t_i) + \alpha_y \sum_{t_i \in E_y} \phi(t-t_i) \tag{2}$$

In the case of the functionalization model, a coefficient $\alpha_x$ of the second term is a parameter in which a patient background factor is a variable, which is expressed by equation (3) below. To be more specific, the coefficient $\alpha_x$ is expressed by a function $\sigma$ of the sum $(W_x Z + b_x)$ of a product of each patient background factor and a weight $W_x$, and a bias $b_x$. The fixed effect term that does not depend on the patient background information is $b_x$, and the random effect term that is characterized by the patient background information is $W_x$. When the coefficient $\alpha_x$ is equivalent to zero, this indicates that there is no causality from the medical care event x to the medical care event y. The weight $W_x$ and bias $b_x$ are examples of the model parameters. The coefficient $\alpha_y$ of the third term may be expressed by taking into account the patient background factor, like the coefficient $\alpha_x$, or may be expressed by not taking into account the patient background factor. The coefficient $\alpha_x$ is an example of the edge feature of the edge from the medical care event x to the medical care event y. The coefficient $\alpha_y$ is an example of the edge feature of the edge from the medical care event y to the medical care event x.

$$\alpha_x = \sigma(W_x Z + b_x) \quad (3)$$

Based on the medical care event information of a plurality of patients, the processing circuitry 31 executes a Granger causality test with respect to the edge connecting the medical care event x to the medical care event y, and determines the weight $W_x$ and bias $b_x$, which are model parameters of the mathematical model that represents the edge feature of the edge. In one example, the Granger causality is tested by using an F-test. For example, the present probability of occurrence of the medical care event y, $\lambda_y(t)$, is estimated in a case where the second term is put in equation (2) and in a case where the second term is not put in equation (2). Next, a statistical difference in estimation error of the probability of occurrence of both, $\lambda_y(t)$, is determined based on the F-test. The weight $W_x$ and bias $b_x$ included in the coefficient $\alpha_x$ are determined in accordance with the statistical difference. If there is no statistical difference, the coefficient $\alpha_x$ is set to zero. The combination between the medical care event x to the medical care event y is successively changed from among the medical care events included in the medical care event information of patients, and the Granger causality is determined with respect to all combinations. Thereby, in regard to all edges included in the medical knowledge graph, the model parameters of the mathematical model relating to the edge features are determined. Note that when it is determined that Granger causality is absent between the medical care event x and the medical care event y, no edge is present between the medical care event x and the medical care event y, and, accordingly, the edge feature is zero, and the weight $W_x$ and bias $b_x$, which are model parameters, are also determined to be zero.

The processing circuitry 31 correlates, in regard to each of edge numbers, an edge feature and model parameters of the mathematical model relating to the edge feature. For example, the processing circuitry 31 creates a database, such as an LUT (Look Up Table), in which, in regard to each of edges, an edge feature and model parameters of the mathematical model relating to the edge feature are correlated. Hereinafter, this database is referred to as "edge feature DB".

FIG. 12 is a view illustrating an example of the edge feature DB. As illustrated in FIG. 12, the edge feature DB correlates and stores an edge number, an edge feature and model parameters such that the edge number, edge feature and model parameters mutually searchable. For example, an edge number "1" is correlated with an edge feature "e1" and model parameters "$W_x 1$" and "$b_x 1$". Note that in the stratification model, the model parameters are determined in regard to each of patient background factors. The edge feature DB is stored in the medical knowledge graph storage apparatus 2.

Although equation (3) is designed on the assumption that the dense layer 63 is a linear neural network of a single layer, equation (3) may be designed on the assumption that the dense layer 63 is a linear neural network of multiple layers, or may be designed on the assumption that the dense layer 63 is some other neural network such as a convolution neural network (CNN) or a recurrent neural network (RNN).

In the above-described embodiment, it is assumed that the mathematical model is a functionalization model. However, the mathematical model according to the embodiment may be a mixed model. Like the functionalization model, the mixed model is composed of a combination of the fixed effect term that does not depend on the patient background information, and the random effect term that is characterized by the patient background factors. In the case of the mixed model, the coefficient $\alpha_x$ may be estimated by using a generalized linear mixed model or a hierarchical Bayesian model, in which patient background information is taken into account. Besides, the mathematical model may be a stratification model. In the case of the stratification model, a Granger causality test is conducted in regard to each of patient groups (for example, a male group and a female group) that are stratified by the patient background information, and different coefficients $\alpha_x$ may be computed in regard to the respective patient groups. Note that the coefficient $\alpha_x$ that is used in this case may not be a function including the weight $W_x$ and bias $b_x$, but may be a general function.

If step SA2 is executed, the processing circuitry 31 determines, by implementing the learning function 312, parameters of the mathematical model relating to the node feature and learning parameters by machine learning based on the patient background information, medical care event information and mathematical model (step SA3).

Figure 13:
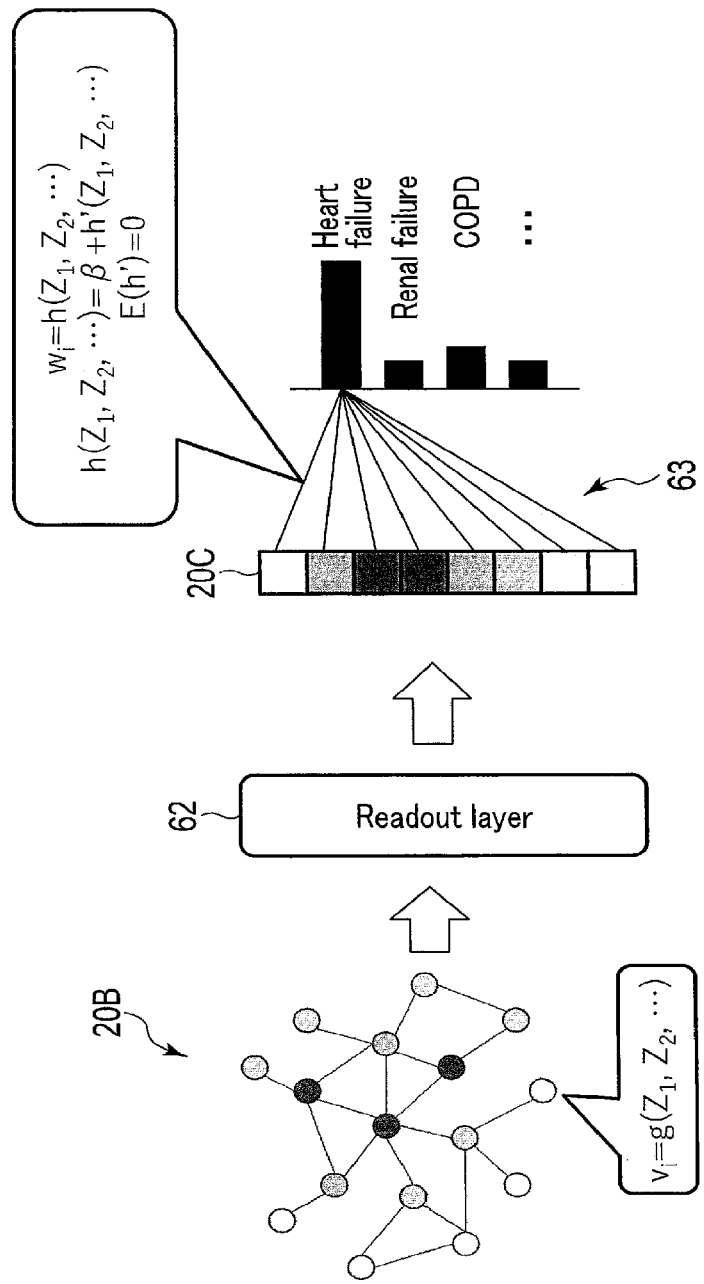
FIG. 13 is a view illustrating an outline of a mathematical model relating to a node feature and learning parameters relating to step SA3 in FIG. 9.

FIG. 13 is a view illustrating an outline of a mathematical model relating to a node feature and learning parameters. As illustrated in FIG. 13, a node feature $v_i$ of a node included in the medical knowledge graph 20B is, as indicated in equation (4) below, is expressed by a mathematical model g in which the patient background information Z is a variable. The patient background information Z includes patient background factors $Z_1, Z_2, \ldots$.

$$v_i = g(Z_1, Z_2, \ldots) \quad (4)$$

Hereinafter, it is assumed that the mathematical model g is expressed by a functionalization model. In this case, the mathematical model g is composed of a combination of the fixed effect term that does not depend on the patient background information, and the random effect term that is characterized by the patient background factors.

As illustrated in FIG. 13, a learning parameter $w_i$ of the dense layer 63 is expressed by a mathematical model h in which the patient background information Z is a variable, as indicated by equation (5) below. The patient background information Z includes patient background factors $Z_1, Z_2, \ldots$.

$$w_i = h(Z_1, Z_2, \ldots) \quad (5)$$

Hereinafter, it is assumed that the mathematical model h is expressed by a functionalization model. In this case, as indicated in equation (6) below, the mathematical model h is composed of a combination of a fixed effect term p that does not depend on the patient background information, and a random effect term h' that is characterized by the patient background factors. As indicated in equation (7) below, an expected value of the random effect term h' is zero.

$$h(Z_1, Z_2, \ldots) = \beta + h'(Z_1, Z_2, \ldots) \quad (6)$$

$$E(h') = 0 \quad (7)$$

Machine learning is used in order to determine the parameters of the mathematical model relating to the node feature and learning parameters. Specifically, at a time of training the learning parameters of the machine learning model illustrated in FIG. 6, the parameters of the mathematical model relating to the node feature and learning parameters are also determined. Hereinafter, the machine learning is described.

Figure 14:
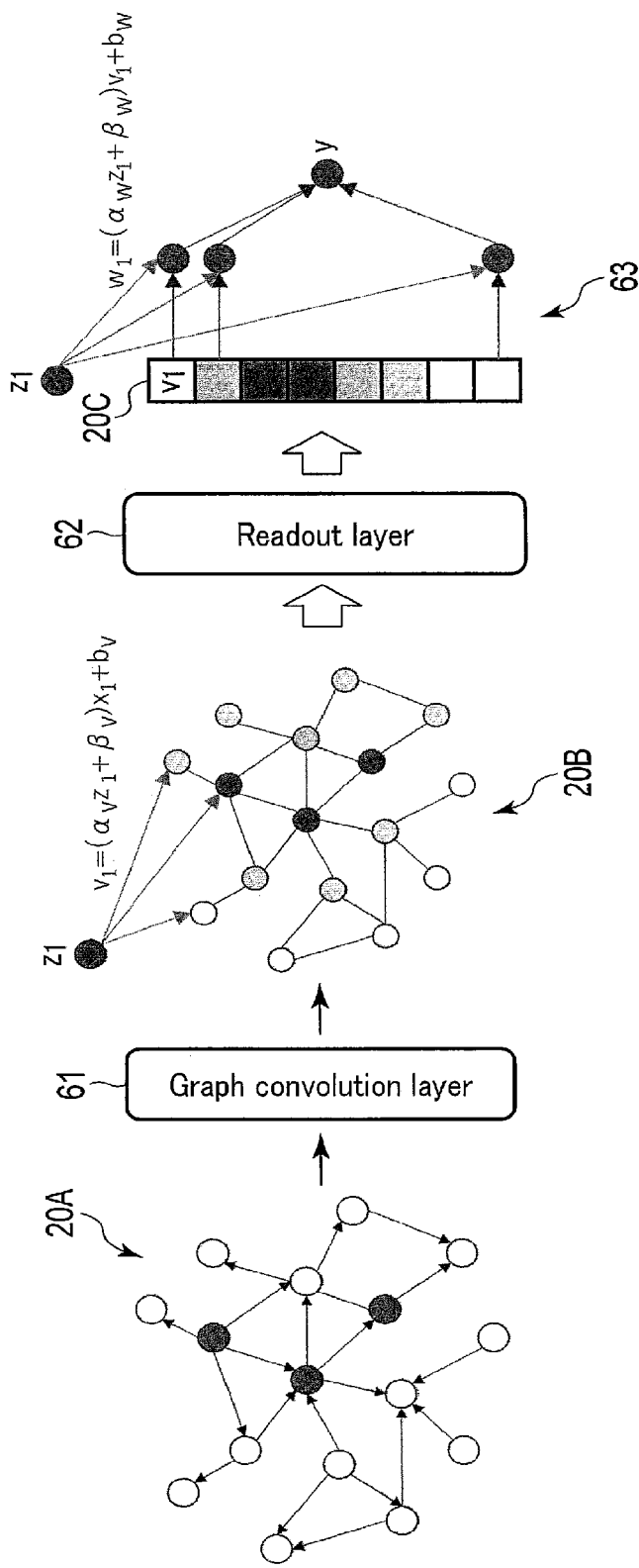
FIG. 14 is a view schematically illustrating a determination process of parameters of a mathematical model relating to the node feature and learning parameters by machine learning in step SA3 in FIG. 9.

FIG. 14 is a view schematically illustrating a determination process of parameters of a mathematical model relating to the node feature and learning parameters by machine learning. As illustrated in FIG. 14, the machine learning model 60 inputs therein the patient graph 20A, and the learning parameters are trained in such a manner as to output a disease label y. The machine learning model 60 includes a graph convolution layer 61, a readout layer 62 and a dense layer 63. The graph convolution layer 61 inputs therein the patient graph 20A before convolution and outputs the patient graph 20B after convolution.

The node feature of each node included in the patient graph 20B is affected by the patient background information. For example, a node feature $v_i$ of a node number "i" is affected by the patient background information Z. The node feature $v_i$ is expressed by a mathematical model indicated in equation (8) below. As indicated in equation (8), the node feature $v_i$ is expressed by the sum of a product of a coefficient $(\alpha_v Z + \beta_v)$ and an initial node feature $x_i$, and a bias $b_v$. The fixed effect term that does not depend on the patient background information Z is $\beta_v$, and the random effect term that is characterized by the patient background information Z is $\alpha_v$. Note that the weight $\alpha_v$, bias $\beta_v$, and bias $b_v$ are determined in regard to each of nodes.

$$v_i = (\alpha_v Z + \beta_v) x_i + b_v \qquad (8)$$

The readout layer 62 converts the graph feature of the patient graph 20B after convolution to the feature vector 20C. A plurality of elements of the feature vector 20C correspond to a plurality of nodes included in the patient graph 20B in a one-to-one correspondence. For example, as illustrated in FIG. 14, a node feature $v_1$ of a first node included in the patient graph 20B is allocated to a first element of the feature vector 20C.

The dense layer 63 converts the feature vector 20C to a disease label y. For example, the dense layer 63 applies a softmax operation based on the node features of elements included in the feature vector 20C, and computes disease information indicative of the disease relevance probability of each of disease classes. FIG. 14 illustrates a softmax operation of a certain disease class y. At this time, each node feature v is multiplied by a weight parameter w that is determined in accordance with a combination of each element and the disease class y. The weight parameter w is affected by the patient background information. For example, a weight parameter $w_i$ of an element number (node number) "i" is affected by the patient background information. The weight parameter $w_i$ is expressed by a mathematical model indicated in equation (9) below. As indicated in equation (9), the weight parameter $w_i$ is expressed by the sum of a product of a coefficient $(\alpha_w Z + \beta_w)$ and a node feature $v_i$, and a bias $b_w$. The fixed effect term that does not depend on the patient background information Z is $\beta_w$, and the random effect term that is characterized by the patient background information Z is $\alpha_w$. Note that the weight aw, bias $\beta_w$, and bias $b_w$ are determined in regard to each of nodes.

$$w_i = (\alpha_w Z + \beta_w) v_i + b_w \qquad (9)$$

The processing circuitry 31 generates a patient graph by mapping the medical care information on the medical knowledge graph. The processing circuitry 31 trains the learning parameters of the machine learning model, based on supervised learning in which the patient graph is an input sample and the disease information is a teaching sample. The processing circuitry 31 computes a loss function. The loss function is a function that evaluates an error between the disease classification information, which is computed by successively propagating the patient graph through the graph convolution layer, readout layer and dense layer, and the disease information that is the teaching sample. The processing circuitry 31 updates the learning parameters of the machine learning model in such a manner as to minimize the loss function in accordance with a freely selected optimization method. As the optimization method, use may be made of a freely selected method, such as stochastic gradient decent or Adam (adaptive moment estimation).

The processing circuitry 31 determines whether a stop condition is satisfied. For example, the stop condition may be set such that the number of times of update of learning parameters reaches a predetermined number, or that the quantity of update of learning parameters is less than a threshold. The processing circuitry 31 repeats the update of the learning parameters and the computation of the loss function while changing the combination between the input sample and the teaching sample, until the stop condition is satisfied. If the stop condition is satisfied, the processing circuitry 31 sets the learning parameters at the present number of times of update to be final learning parameters. Thereby, the learning ends.

The learning parameters that are trained include the node feature $v_i$ and the weight parameter $w_i$, as well as the weight parameter of the graph convolution layer 61. As indicated in equation (9), since the weight parameter $w_i$ is expressed by the sum of the product of the coefficient $(\alpha_w Z + \beta_w)$ and the node feature $v_i$, and the bias $b_w$, the coefficient $(\alpha_w Z + \beta_w)$ and the bias $b_w$ can be determined from the weight parameter $w_i$ and the node feature $v_i$. In addition, the parameter $\alpha_w$ and parameter $\beta_w$ can be determined from the coefficient $(\alpha_w Z + \beta_w)$ and the patient background information Z. As indicated in equation (8), since the node feature $v_i$ is expressed by the sum of the product of the coefficient $(\alpha_v Z + 3)$ and the initial node feature $x_i$, and the bias $b_v$, the coefficient $(\alpha_v Z + \beta_v)$ and the bias $b_v$ can be determined from the initial node feature $x_i$ and the node feature $v_i$. In addition, the parameter $\alpha_v$ and the parameter $\beta_v$ can be determined from the $(\alpha_v Z + \beta_v)$ and the patient background information Z.

The processing circuitry 31 correlates, in regard to each node, the node feature and the model parameters of the mathematical model relating to the node feature. For example, the processing circuitry 31 creates a database, such as an LUT, in which, in regard to each node, the node feature and the model parameters of the mathematical model relating to the node feature are correlated. Hereinafter, this database is referred to as "node feature DB".

FIG. 15 is a view illustrating an example of the node feature DB. As illustrated in FIG. 15, the node feature DB correlates and stores a node number, a node feature and model parameters such that the node number, node feature and model parameters are mutually searchable. For example, a node number "1" is correlated with a node feature "v1" and model parameters "$\alpha_v 1$", "$\beta_v 1$" and "$b_v 1$" relating to the mathematical model of the node feature. The node feature DB is stored in the medical knowledge graph storage apparatus 2.

Similarly, the processing circuitry 31 correlates, in regard to each weight parameter, the weight parameter and the model parameters of the mathematical model relating to the weight parameter. For example, the processing circuitry 31 creates a database, such as an LUT, in which, in regard to each weight parameter number, the weight parameter and the model parameters of the mathematical model relating to the weight parameter are correlated. Hereinafter, this database is referred to as "weight parameter DB".

FIG. 16 is a view illustrating an example of the weight parameter DB. As illustrated in FIG. 16, the weight parameter DB correlates and stores a weight parameter number, a weight parameter and model parameters such that the weight parameter number, weight parameter and model parameters are mutually searchable. For example, a weight parameter number "1" is correlated with a weight parameter "w1" and model parameters "$\alpha_w 1$", "$\beta_w 1$" and "$b_w 1$" relating to the weight parameter. The weight parameter DR is stored in the medical knowledge graph storage apparatus 2.

Although equation (8) and equation (9) are designed on the assumption that the dense layer 63 is a linear neural network of a single layer, equation (8) and equation (9) may be designed on the assumption that the dense layer 63 is a linear neural network of multiple layers, or may be designed on the assumption that the dense layer 63 is some other neural network such as a convolution neural network (CNN) or a recurrent neural network (RNN).

In the above-described embodiment, it is assumed that the mathematical model is a functionalization model. However, the mathematical model according to the embodiment may be a mixed model. Like the functionalization model, the mixed model is composed of a combination of the fixed effect term that does not depend on the patient background information, and the random effect term that is characterized by the patient background factors. In the case of the mixed model, the weight $\alpha_v$ and the weight $\alpha_w$ may be estimated by using a generalized linear mixed model or a hierarchical Bayesian model, in which patient background information is taken into account. Besides, the mathematical model may be a stratification model. In the case of the stratification model, a Granger causality test is conducted in regard to each of patient groups (for example, a male group and a female group) that are stratified by the patient background information, and different weights $\alpha_v$ and $\alpha_w$ may be computed in regard to the respective patient groups. Note that the weight $\alpha_v$ and the weight $\alpha_x$ that are used in this case may not be a function including the weight $W_x$ and bias $b_x$ as in equation (3), but may be a general function.

If step SA3 is executed, the processing circuitry 31 outputs a medical knowledge graph and a trained model by implementing the learning function 312 (step SA4). In step SA4, the processing circuitry 31 outputs a medical knowledge graph to which model parameters of the mathematical model relating to the edge feature and model parameters of the mathematical model relating to the graph feature are allocated. Note that when the edge features are fixed regardless of patients, a medical knowledge graph, to which edge features are allocated, may be output. In addition, the processing circuitry 31 outputs a machine learning model to which the weight parameter and the model parameters of the mathematical model relating to the weight parameter are allocated. The output medical knowledge graph and machine learning model are stored in the medical knowledge graph storage apparatus 2.

If step SA4 is executed, the learning process ends.

Note that the above-described learning process is merely an example, and various modifications can be made. For example, step SA2 and step SA3 may be executed in a reverse order, or may be executed in parallel. In addition, in step SA3, it is assumed that the parameters of the mathematical model relating to the node feature and the parameters of the mathematical model relating to the learning parameters are determined based on the supervised learning, but these parameters may be determined based on a hierarchical Bayesian model.

As described above, the medical information learning apparatus 3 includes the processing circuitry 31 and the memory 32. The processing circuitry 31 obtains the patient background information relating to the background factors of a plurality of patients. The memory 32 stores the medical knowledge graph including the nodes corresponding to the medical care events, and the edges indicative of the relationship between the nodes. The graph features of the medical knowledge graph are characterized by the mathematical model including the patient background information. The processing circuitry 31 determines the model parameters of the mathematical model, based on the patient background information of patients and the mathematical model.

According to the above configuration, the graph features of the medical knowledge graph can be defined by the mathematical model using the patient background information. Thereby, the graph features of the medical knowledge graph can be made to include a variation component due to a difference in patient background between patients.

Next, the medical information processing apparatus 4 according to the present embodiment is described.

Figure 17:
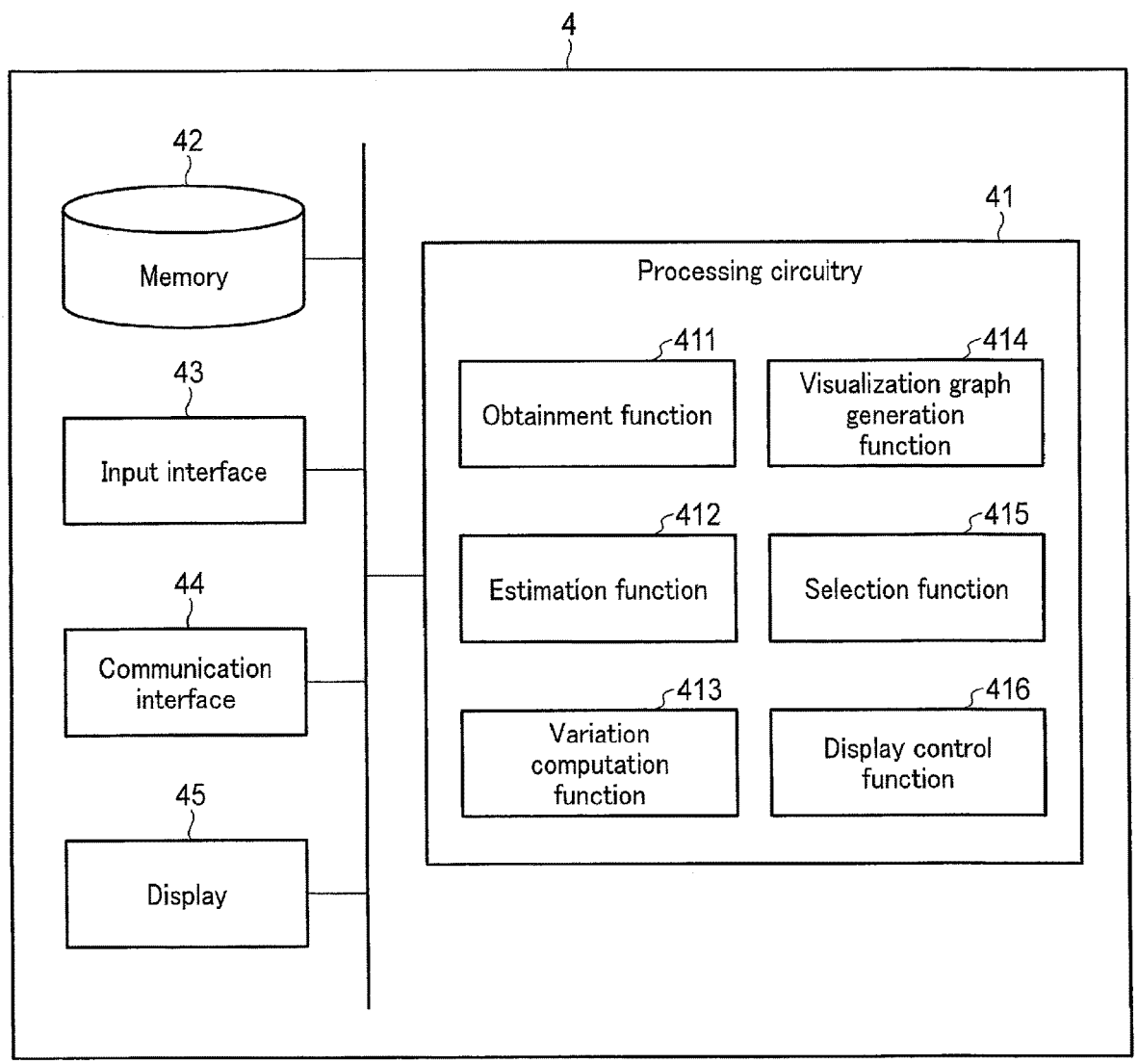
FIG. 17 is a view illustrating a configuration example of a medical information processing apparatus illustrated in FIG. 1.

FIG. 17 is a view illustrating a configuration example of the medical information processing apparatus 4. As illustrated in FIG. 17, the medical information processing apparatus 4 includes processing circuitry 41, a memory 42, an input interface 43, a communication interface 44 and a display 45.

The processing circuitry 41 includes processors such as a CPU and a CPU. The processing circuitry 41 implements an obtainment function 411, an estimation function 412, a variation computation function 413, a visualization graph generation function 414, a selection function 415, and a display control function 416, by executing a medical information processing program in order to display variation. Note that the functions 411 to 416 may not be implemented by single processing circuitry. A plurality of independent processors may be combined to constitute processing circuitry, and the processors may implement the functions 411 to 416 by executing programs. Besides, the functions 411 to 416 may be modularized programs that constitute a medical information processing program, or may be individual programs. The programs are stored in the memory 42.

By implementing the obtainment function 411, the processing circuitry 41 obtains various information. For example, the processing circuitry 41 obtains, from the medical care information storage apparatus 1, the patient background information relating to one or more patients of display targets (hereinafter "target patients"). In addition, the processing circuitry 41 obtains the medical knowledge graph, edge feature DB, node feature DB and weight parameter DB.

By implementing the estimation function 412, the processing circuitry 41 estimates medical judgment information from the patient graph, by using the trained model generated by the medical information learning apparatus 3.

By implementing the variation computation function 413, the processing circuitry 41 computes the variation of the graph feature and/or learning parameters relating to the target patient, based on the patient background information of the target patient and the mathematical model. The graph feature and learning parameters are expressed by the mathematical model in which model parameters are variables. The model parameters are determined by the medical information learning apparatus 3, based on the patient background information.

By implementing the visualization graph generation function 414, the processing circuitry 41 generates a visualization graph that visualizes the medical knowledge graph relating to the patient of the display target. The graph of the visualization graph and/or the edges have a display mode corresponding to the variation of graph features.

By implementing the selection function 415, the processing circuitry 41 selects, when displaying the variation, various display targets such as the patient, medical care event category, and disease. The processing circuitry 41 selects the display targets in accordance with the user's instruction through the input interface 43.

By implementing the display control function 416, the processing circuitry 41 displays various information on the display 45. For example, the processing circuitry 41 displays the variation or the like of the graph feature and/or learning parameters.

The memory 42 is a storage device storing various kinds of information, such as a ROM, a RAM, an HDD, an SSD, an integrated-circuit storage device, or the like. Aside from the above storage device, the memory 42 may be a drive unit that reads/writes various kinds of information from/to a portable storage medium such as a CD, a DVD or a flash memory, or a semiconductor memory device. In addition, the memory 42 may be provided in another computer that is connected to the medical information processing apparatus 4 via a network. For example, the memory 42 stores the medical knowledge graph obtained from the medical knowledge graph storage apparatus 2, the edge feature DB, the node feature DB, and the weight parameter DB.

The input interface 43 accepts various input operations from an operator, converts the accepted input operations to electric signals, and outputs the electric signals to the processing circuitry 41. Specifically, the input interface 43 is connected to input devices such as a mouse, a keyboard, a trackball, a switch, a button, a joystick, a touch pad, and a touch-panel display. The input interface 43 outputs an electric signal, which corresponds to an input operation to the input device, to the processing circuitry 41. In addition, the input device connected to the input interface 43 may be an input device provided in another computer that is connected via a network or the like.

The communication interface 44 is an interface for transmitting/receiving various information to/from other computers such as the medical care information storage apparatus 1, medical knowledge graph storage apparatus 2 and medical information learning apparatus 3 included in the medical information system 100.

The display 45 displays various information in accordance with the display control function 414 of the processing circuitry 41. As the display 45, for example, use can be made of, as appropriate, a liquid crystal display, a CRT display, an organic EL display, a plasma display, or some other freely chosen display. Furthermore, a projector may be provided in place of, or in combination with, the display 45.

Next, a variation display process, which is executed by the processing circuitry 41 according to a medical information display program, is described.

FIG. 18 is a view illustrating a flow of the variation display process. As illustrated in FIG. 18, by implementing the selection function 415, the processing circuitry 41 selects one or more patients of a display target (hereinafter "target patient") (step SB1). For example, in step SB1, a selection screen of the target patient is displayed on the display 45, and one or more patients are selected in accordance with an instruction by the user through the input interface 43. In the present embodiment, it is assumed that one patient is selected as the display target. Note that the medical knowledge graph, the edge feature DB, the node feature DB and the weight parameter DB may be obtained from the medical knowledge graph storage apparatus 2. It is assumed that, where necessary, the processing circuitry 41 reads, as appropriate, the edge feature, node feature, weight parameter and model parameters from the edge feature DB, the node feature DB and the weight parameter DB.

As will be described later, a patient relevant to a specific disease may be selected as the target patient. For example, a list of patients relevant to the heart failure may be displayed, and a specific patient may be selected from the list as the target patient.

If step SB1 is executed, the processing circuitry 41 obtains, by implementing the obtainment function 411, the patient background information of the target patient selected in step SB1 (step SB2). In step SB2 the processing circuitry 41 obtains the patient background information of the target patient from the medical care information storage apparatus 1.

If step SB2 is executed, the processing circuitry 41 computes, by implementing the variation computation function 413, the variation of the graph feature and/or learning parameters, based on the patient background information obtained in step SB2 (step SB3).

The variation of the graph feature means a correlation degree of the graph feature with the patient background. When the graph feature has a constant value regardless of the difference between pieces of patient background information, the variation of the graph feature is small. Conversely, when the graph feature greatly varies in accordance with the difference between pieces of patient background information, the variation of the graph feature is large. When the number of target patients is one, the variation of the graph feature of the target patient can be defined based on graph features at different time points of the patient background information. When the number of target patients is plural, the variation of the graph features of the target patients can be defined based on graph features of different patients at different time points of the patient background information. The same applies to the variation of the learning parameters.

Hereinafter, a variation computation method is concretely described. Typically, the processing circuitry 41 computes, in regard to target patients, the graph features of the target patients, based on the patient background information and the mathematical model of the graph feature, and computes, as variation of the graph feature, an index of dispersion of the graph features over the target patients. As the mathematical model of the graph feature, use is made of a mathematical model in which model parameters are determined by the medical information learning apparatus 3. As the index of dispersion, a standard deviation, a variance or the like may preferably be computed. As the target patients, patients belonging to a statistical population set are selected. The statistical population set can freely be set in accordance with investigation targets, such as all patients, patients contracting a specific disease, male patients, female patients, or patients of a specific age bracket. In regard to the weight parameter, variation can similarly be computed. As the mathematical model of the weight parameter, use is made of a mathematical model in which model parameters are determined by the medical information learning apparatus 3.

Since a case is assumed in which a possible range of values of the graph feature is different between nodes or edges, the processing circuitry 41 may normalize the variation. For example, when the variation of only patients of heart failure is displayed, the dispersion of graph features of the patients of heart failure, among all target patients, may be computed, and the variation can be normalized by dividing "dispersion of graph features of patients of heart failure" by "dispersion of graph features of all patients". As regards the weight parameter, variation can similarly be normalized.

As regards the node feature, the variation of the node feature $v_i$, which is defined by the mathematical model $(v_i=(\alpha_v Z+\beta_v)x_i+b_v)$ of equation (8), may be computed, or only the variation of the coefficient $(\alpha_v Z+\beta_v)$ may be computed. In the case of the former, the variation of the node feature itself can be computed. However, when the value $x_i$ or $v_i$ of the node feature disperses between the patients, there is concern that variation, which is not due to the patient background factor, is taken into account, and interpretation may become more difficult than in the latter. In the case of the latter, variation of mapping on the node feature, which is due to the patient background factor, can be obtained. Whether to compute the variation of the former or to compute the variation of the latter can freely be chosen by the user. Similarly, as regards the weight parameter, the variation of the weight parameter w, which is defined by the mathematical model $(w_i=(\alpha_w Z+\beta_w)v_i+b_w)$ of equation (9), may be computed, or the variation of only the coefficient $(\alpha_w Z+\beta_w)$ may be computed. As regards the edge feature, the variation of the edge feature $\alpha_x$, which is defined by the mathematical model $(a_x=\sigma(W_x Z+b_x))$ of equation (3), is computed.

When the number of target patients is one, the processing circuitry 41 computes, in regard to the patient background information at each of a plurality of time points, the graph feature of the target patient, based on the patient background information and the mathematical model of the graph feature, and computes, as variation of the graph feature, an index of dispersion of the graph features over the time points. As the index of dispersion, a standard deviation, a variance or the like may preferably be computed. As regards the weight parameter, variation can similarly be computed. In addition, when the number of target patients is one, the processing circuitry 41 may compute, as variation, a deviation value of the graph feature of the target patient or the weight parameter, relative to the dispersion of graph features or weight parameters, which are computed with respect to the statistical population set.

If step SB3 is executed, the processing circuitry 41 displays the variation computed in step SB3 by implementing the display control function 416 (step SB4). The variation is displayed on the display 45.

FIG. 19 is a view illustrating an example of a display screen I1 of variation. As illustrated in FIG. 19, the display screen I1 includes a display field Ill of a medical knowledge graph 81, a selection field 112 of a patient, a selection field 113 of a disease, and a selection field 114 of a medical care event category.

The selection field 112 displays an identifier of a patient (hereinafter referred to as "patient identifier"). As the patient identifier, a patient ID, a patient name or the like is used. The patient identifier displayed in the selection field 112 can be selected by the operator through the input interface 33 or the like. The selected patient identifier may preferably be emphasized. For example, in FIG. 19, a patient identifier "00003" is emphasized. Note that, as regards the patient identifier, one or more patient identifiers can be selected.

The selection field 113 displays an identifier of a target disease (hereinafter referred to as "disease identifier"). As the disease identifier, the name, symbol or the like of a disease is used. The disease identifier displayed in the selection field 113 can be selected by the operator through the input interface 33 or the like. The selected disease identifier may preferably be emphasized. For example, in FIG. 19, a disease identifier "heart failure" is emphasized. When a disease identifier is selected, the patient identifier of the patient relevant to the disease corresponding to the disease identifier is displayed in the selection field 112. The disease identifier and the patient identifier are correlated and managed in the medical care information storage apparatus 1 or the like. Note that as regards the medical care event category, one category may be selected, or a plurality of categories may be selected. As regards the disease identifier, one or more disease identifiers can be selected.

The selection field 114 displays a list of medical care event categories of display targets. A medical care event category that is displayed may be the name or symbol of the medical care event category, or a simulated image or a thumbnail image of the patient graph relating to the medical care event category. The selected medical care event category may preferably be emphasized. For example, in FIG. 19, a check mark is put on the medical care event category "symptom". Note that one or more medical care event categories can be selected.

The display field Ill displays a visualization graph 81 that visualizes the medical knowledge graph of the target patient. The visualization graph 81 includes nodes 82 corresponding to medical care events, and edges 83 connecting the nodes 82. The nodes 82 are displayed by being accompanied with the names or symbols of the corresponding medical care events.

The visualization graph 81 is displayed, for example, by the following procedure. To start with, the processing circuitry 31 specifies the medical care event category selected in the selection field 114. When the medical care event category is not selected in the selection field 114, or the visualization graph 81 is displayed by default, all medical care event categories are specified as selected medical care event categories. Then, the processing circuitry 31 extracts, from the medical knowledge graph, a graph (hereinafter referred to as "partial graph") which is composed of nodes belonging to the specified medical care event category and edges connecting the nodes. For example, in FIG. 19, since the symptom category is selected in the selection field 114, a partial graph, which is composed of nodes belonging to the symptom category and edges connecting the nodes, is extracted from the medical knowledge graph.

Then, the processing circuitry 41 displays the visualization graph 81 that visualizes the partial graph, displays the nodes 82 in a display mode corresponding to the variation of node features, and displays the edges 83 in a display mode corresponding to the variation of edge features. For example, in FIG. 19, the nodes 82 are displayed such that the degree of blurring of contours of the nodes 82 becomes greater as the degree of variation becomes greater. In addition, the edges 83 are displayed such that the degree of blurring of straight lines representing the edges 83 becomes greater as the degree of variation becomes greater. Note that the variation of only either the nodes 82 or the edges 83 may be displayed.

In order to facilitate the understanding of the degree of variation, it is preferable to display, at freely chosen parts of the display screen I1, an object I15 that indicates stepwise the degree of blurring of straight lines representing the edges, and an object I16 that indicates stepwise the degree of blurring of contours of the nodes.

In this manner, by visualizing the variation of node features on the nodes 82, and visualizing the variation of edge features on the edges 83, it becomes possible to understand the degree of variation between the pieces of patient background information of the target patient. In addition, since the variation is displayed in regard to each node 82 and edge 83, the variation can be confirmed in regard to each node 82 and edge 83.

As illustrated in FIG. 19, the display screen I1 may preferably be provided with a display field 117 of variation of medical judgment information. The display field 117 displays the variation of medical judgment information, which is computed in regard to the target patient. For example, as the variation of medical judgment information, variation of a disease relevance probability, which is an example of the disease classification information, is displayed. For example, as illustrated in FIG. 19, the variation of the disease relevance probability is displayed like "70%±20%". "70%" corresponds to a median of the disease relevance probability, and "±20%" corresponds to variation. The display method of the variation of the disease relevance probability is not limited to the above-described method, and a possible range of the disease relevance probability, such as "50%-90%", may be displayed.

The variation of the disease relevance probability can be computed based on the variation of the weight parameter. Strictly speaking, the variation of the disease relevance probability depends on not only the variation of the weight parameter, but also the variation of the node feature and edge feature.

Specifically, the variation of the disease relevance probability is computed as follows. To begin with, the processing circuitry 41 computes, in regard to each of a plurality of target patients, the disease relevance probability, based on the patient background information of the target patient, the patient graph of the target patient and a machine learning model, and computes, as variation of the disease relevance probability, an index of dispersion of the disease relevance probabilities over the target patients. The patient graph is generated by mapping the medical care event information of the target patient on the medical knowledge graph to which graph features defined by the mathematical model are allocated, the model parameters of the mathematical model being determined by the medical information learning apparatus 3. The weight parameter $w_i$ defined by the mathematical mode, in which model parameters are determined by the medical information learning apparatus 3, is allocated to the dense layer of the machine learning model. As the index of dispersion, a standard deviation, a variance or the like may preferably be computed.

Note that the nodes 82 and edges 83 may be displayed in an additional display mode corresponding to the graph features, as well as in the display mode corresponding to the variation. In this case, the processing circuitry 41 allocates the node features to the nodes 82, and allocates the edge features to the edges 83. When the node feature is defined by a single-dimensional scalar value of relevance or irrelevance, the processing circuitry 41 allocates the scalar value to the node. When the node feature is defined by a multi-dimensional vector of the count of occurrences, the order of occurrence and the degree of occurrence, the processing circuitry 41 aggregates the vector and converts the vector into a scalar value, and allocates the scalar value to the node 82. For example, the node 82 is displayed such that the display color of the node 82 becomes deeper as the node feature becomes greater.

Similarly, when the edge feature is defined by a single-dimensional scalar value of presence or absence, the processing circuitry 31 allocates the scalar value to the edge. When the edge feature is defined by a multidimensional vector, the processing circuitry 31 aggregates the vector and converts the vector into a scalar value, and allocates the scalar value to the edge 83. Then, the processing circuitry 31 displays the node 82 in a display mode corresponding to the node to which the scalar value is allocated, and displays the edge 83 in a display mode corresponding to the edge to which the scalar value is allocated. For example, the edge 83 is displayed such that the edge 83 becomes thicker as the edge feature becomes greater.

Note that the display method of the variation of the graph feature is not limited to the above method. For example, the variation of the node feature may be displayed such that the numerical value or category indicative of the degree of variation is added to the node, and the variation of the edge feature may be displayed such that the numerical value or category indicative of the degree of variation is added to the edge. In addition, the numerical values or categories indicative of the node feature and edge feature may be displayed in a table form together with the node number and the edge number.

The variation of the learning parameters may be displayed on the display screen I1. Since the variation of the learning parameters affects, for example, the disease classification information estimated by the trained model, the variation may preferably be displayed together with the disease classification information of the target patient. For example, the numerical value or category indicative of the degree of variation may preferably be displayed.

If step SB4 is executed, the display process ends.

Note that the above-described variation display process is merely an example, and various modifications can be made.

In one example, in the above-described embodiment, it is assumed that the number of target patients is one, but the number of target patients may be plural. Hereinafter, as Modification 1, a description is given of a display example of variation in a case where all patients relevant to heart failure are designated as parget patients.

Figure 20:
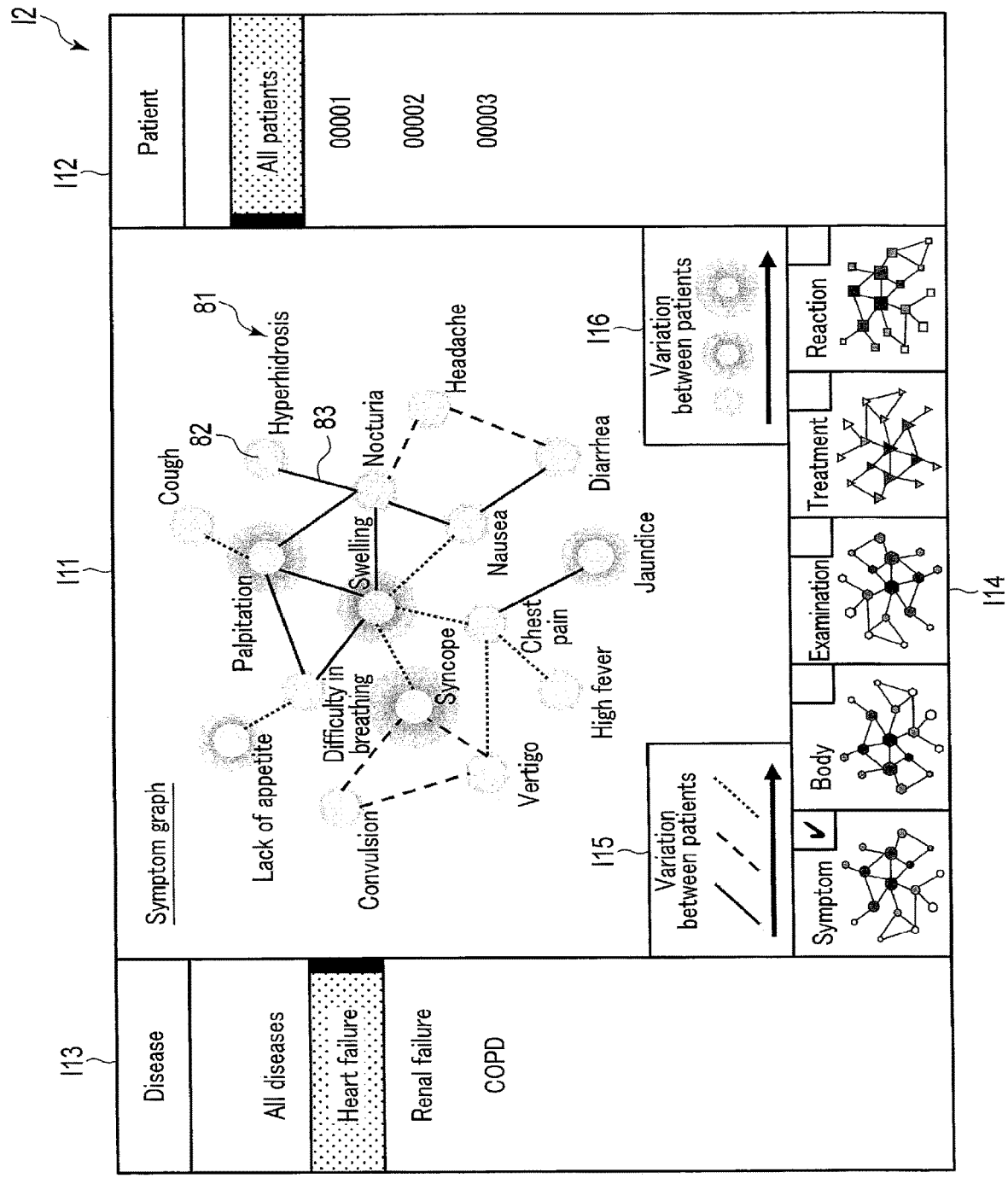
FIG. 20 is a view illustrating a display screen of variation in a case where all patients relevant to heart failure are designated as target patients.

FIG. 20 is a view illustrating a display screen 12 of variation in a case where all patients relevant to heart failure are designated as target patients. As illustrated in FIG. 20, the display field Ill displays a medical knowledge graph 81 relating to all patients relevant to heart failure. Each node 82 is displayed with a degree of blurring corresponding to the variation of the node feature relating to all patients relevant to heart failure, and each node 83 is displayed with a degree of blurring corresponding to the variation of the edge feature relating to all patients relevant to heart failure.

According to Modification 1, by displaying the variation of the graph features relating to all patients relevant to a specific disease, the variation between patients can be confirmed.

In another example, variation may be displayed in regard to each of patient background factors. Hereinafter, as Modification 2, a display example of variation in regard to each of patient background factors is described. Note that the display of variation in regard to each of patient background factors can be implemented when model parameters are determined in regard to each of patient background factors, such as when the mathematical model is a stratification model or a mixed model.

Figure 21:
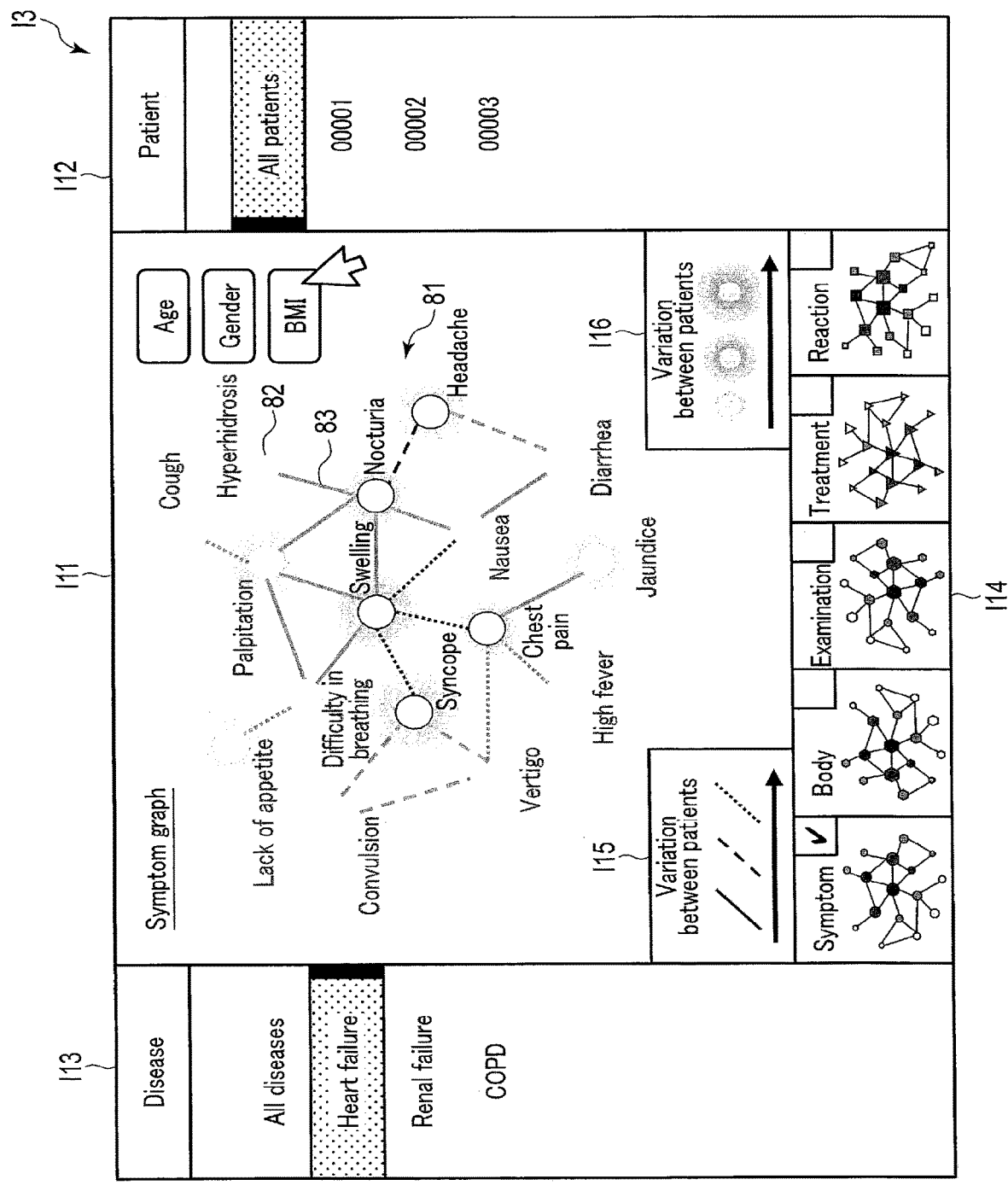
FIG. 21 is a view illustrating a display screen of variation in regard to each of patient background factors.

FIG. 21 is a view illustrating a display screen 13 of variation in regard to each of patient background factors. As illustrated in FIG. 21, the display screen 13 displays GUI buttons for selecting a patient background factor. For example, in the case of FIG. 21, the display field Ill displays an age button for selecting a patient background factor "age", a gender button for selecting a patient background factor "gender", and a BMI button for selecting a patient background factor "BMI". These GUI buttons are displayed in such a manner as to be selectable by the user through the input interface 43.

When any one of the GUI buttons is selected, the processing circuitry 41 displays, with emphasis, the node or edge which strongly fluctuates due to the patient background factor corresponding to the selected GUI button. The node or edge is displayed with emphasis by, for example, the following method. To begin with, the processing circuitry 41 specifies the patient background factor corresponding to the selected GUI button as a factor of interest. The processing circuitry 41 specifies model parameters relating to the factor of interest, among the model parameters of each node and edge. For example, the weight $\alpha_v$ of equation (8) and the weight $\alpha_w$ of equation (9), which are coefficients of the specified patient background factor, are specified as the model parameters. When the specified model parameter has a value that is equal to or greater than a threshold, the processing circuitry 41 displays, with emphasis, the node or edge relating to the model parameter as the node or edge that strongly fluctuates due to the factor of interest. In another method, the processing circuitry 41 may fix values of the patient background factors other than the factor of interest, may change the value of the factor of interest to a large value, and may emphasize the computed variation of the node or edge.

For example, as illustrated in FIG. 21, when BMI is selected as a patient background factor of interest, the nodes 82 and edges 83, which strongly fluctuate due to BMI, are displayed with emphasis in the visualization graph 81. The other nodes 82 and edges 83 are displayed more thinly than the nodes 82 and edges 83 which strongly fluctuate. Thereby, it is possible to visualize only the variation of the nodes and edges relating to the patient background factor of interest.

According to Modification 2, the variation, which is limited to the patient background factor of the user's interest, can be displayed. The user can confirm the variation of an individual patient background factor.

In another example, two or more medical care event categories may be selected. Hereinafter, as Modification 3, a description is given of a display example of variation at a time when the treatment category and the reaction category are selected. A visualization graph relating to the treatment category and the reaction category is referred to as "treatment-reaction graph". Variation is displayed together with the treatment-reaction graph.

Figure 22:
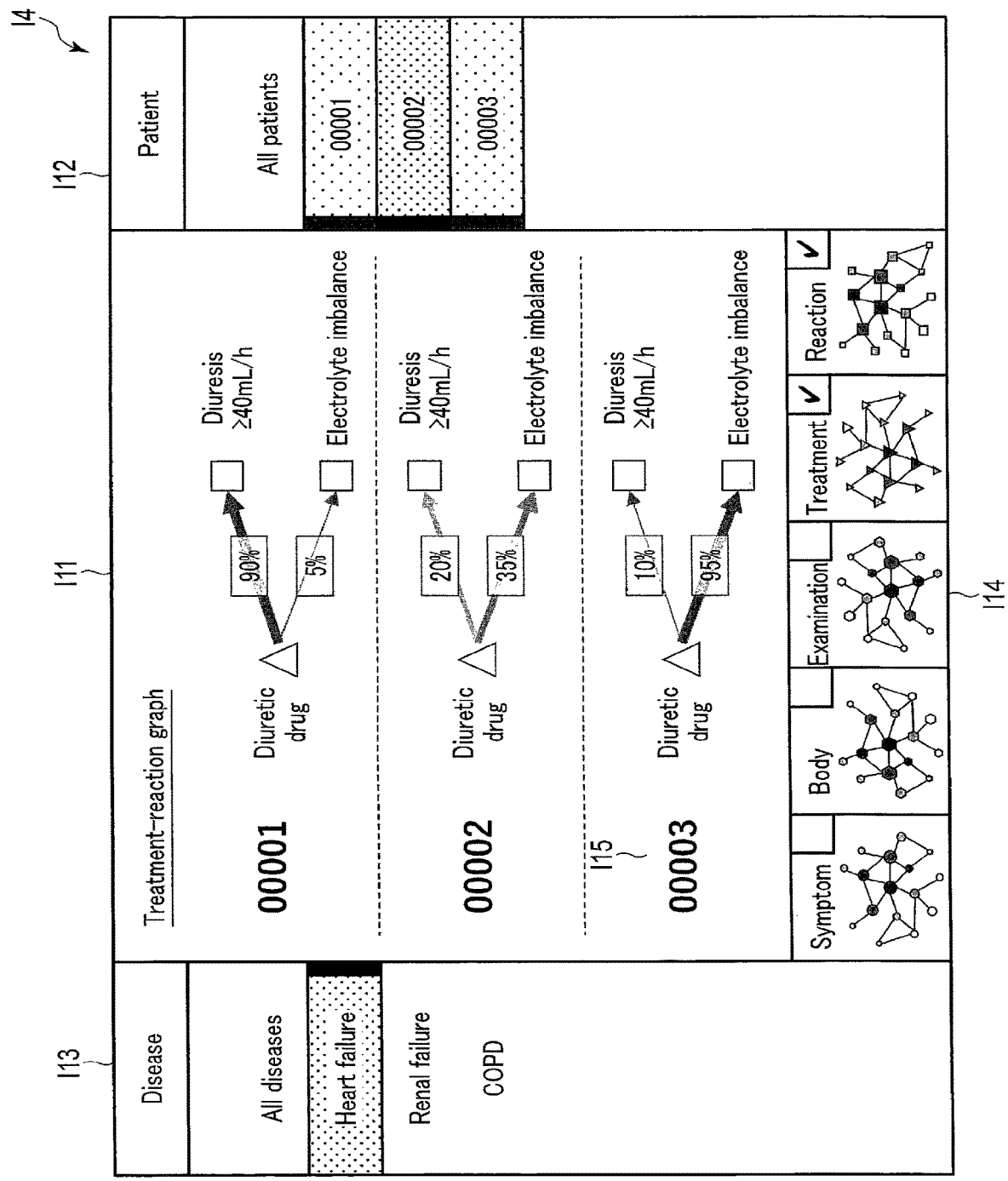
FIG. 22 is a view illustrating a treatment-reaction graph and variation.

FIG. 22 is a view illustrating a display screen 13 of a treatment-reaction graph and variation. As illustrated in FIG. 22, the treatment and the reaction are selected as medical care event categories of display targets. In addition, as target patients, patient [00001], patient [00002] and patient [00003] relevant to heart failure are selected. In this case, the display field Ill displays a treatment-reaction graph that is a visualization graph which visualizes the medical knowledge graph indicating the relationship between the medical care event and the reaction event in regard to the patient [00001], patient [00002] and patient [00003]. For example, the node of the treatment event "diuretic drug" indicative of the administration of a diuretic drug, the node of the reaction (to be more specific, treatment reaction) event "diuresis 40 mL/h or more" indicative of the diuresis of 40 mL/h or more, and the node of the reaction (to be more specific, side effect) event "electrolyte imbalance" indicative of the occurrence of electrolyte imbalance in urine are connected by edges.

A numerical value indicative of the degree of variation of the edge feature is added to each edge. For example, in the treatment-reaction graph of the patient "00001", a numerical value "90%" is displayed as the degree of correlation or causality of the edge in regard to the edge from the treatment event "diuretic drug" to "diuresis 40 mL/h or more", and a numerical value "5%" is displayed as the degree of correlation or causality of the edge in regard to the edge from the treatment event "diuretic drug" to "electrolyte imbalance". As illustrated in FIG. 22, that the degree of correlation or causality is different between patients means that variation occurs. The degree of correlation or causality of the edge may be indicated not only by the method of indicating the numerical value, but also by a mode of the thickness or the like of the edge, as illustrated in FIG. 22.

According to Modification 3, the variation, together with the treatment-reaction graph, can be displayed. By displaying the treatment-reaction graph, the treatment effect estimation can be made. At this time, by displaying the variation of the edge feature or the like, the variation of the treatment effect between patients can also be evaluated.

As described above, the medical information processing apparatus 4 according to the embodiment includes the processing circuitry 41 and the memory 42. The processing circuitry 41 obtains patient background information relating to a background factor of one or more target patients. The memory 42 stores a medical knowledge graph including nodes corresponding to medical care events, and edges indicative of a relationship between the nodes. A graph feature of the medical knowledge graph is expressed by a mathematical model characterized by patient background information. The processing circuitry 41 computes variation of the graph feature relating to the target patient, based on the patient background information of the target patient and the mathematical model. The processing circuitry 41 displays the variation of the graph feature.

According to the above-described configuration, the variation of graph features between pieces of patient background information can be displayed. The variation is useful if the variation is displayed when the disease is explained to the patient or the like. For example, even in the case of an identical disease, it can be understood that a specific symptom appears in one person and does not appear in another person, and even in the case of an identical disease, it can be understood that a treatment effect is great in one person and is small in another person. In addition, the variation is useful if the variation is displayed when discovering research hypotheses. For example, it is possible to know candidates of new sub-type classification, or to understand a qualification criterion of research design. Besides, the variation is useful if the variation is displayed when performing disease name candidate estimation, treatment reaction estimation and prognosis estimation. For example, estimation with individual differences taken into account can be executed.

Furthermore, by visualizing the variation of graph features on the nodes and edges of the medical knowledge graph, individual differences of patients can be visualized while maintaining common concepts or interpretations in regard to the relationship between medical care events.

Hereinafter, various applied examples of the medical information system 100 according to the present embodiment will be described. The applied examples below are applicable, as appropriate, to the above-described examples.

Applied Example 1

FIG. 23 is a view representing an outline of graph features according to Applied Example 1. As illustrated in FIG. 23, as the graph feature, medical care event information, such as a relevance/irrelevance feature, a temporal feature and/or a local feature, is allocated to each node of the patient graph 20A. The relevance/irrelevance feature is information indicative of a degree of relevance or a degree of irrelevance to the medical care event corresponding to the node. The temporal feature is information relating to a time of occurrence of the medical care event. Specifically, the temporal feature is the date/time of occurrence of the medical care event, the order of occurrence, the count of occurrences, or the like. The local feature is information relating to a location of occurrence of the medical care event. Specifically, the local information is a position of occurrence of the medical care event, a location of occurrence, or the like. The position of occurrence is sensor information of GPS (Global Positioning System) or the like, which represents a point of occurrence of the medical care event. The location of occurrence is an address or a name of a medical institution, a hospital department, the home, or a hospital, where the medical care event is diagnosed.

As described above, by implementing the variation computation function 413, the processing circuitry 41 computes the variation of the graph feature relating to the target patient, based on the patient background information of the target patient and the mathematical model. Each of the relevance/irrelevance feature, temporal feature and local feature is mathematized by the mathematical model of equation (8). The variation of each of the relevance/irrelevance feature, temporal feature and local feature may be computed, for example, as a dispersion index of the feature between patients. By implementing the visualization graph generation function 414, the processing circuitry 41 generates a visualization graph having a display mode corresponding to the variation of each feature. The feature of the display target of the variation can freely be selected from among the relevance/irrelevance feature, temporal feature and local feature. By implementing the display control function 416, the processing circuitry 41 displays the generated visualization graph in a display mode corresponding to the variation.

The processing circuitry 41 may compute a comprehensive variation of the relevance/irrelevance feature, temporal feature and local feature. In one example, the processing circuitry 41 may compute the variation of each of the relevance/irrelevance feature, temporal feature and local feature, and may compute a statistical value (an average value, a minimum value, a maximum value, or the like) of the variation of each feature as the comprehensive variation.

Applied Example 2

FIG. 24 is a view representing an outline of a graph feature according to Applied Example 2. As illustrated in FIG. 24, as the graph feature, time-series medical care event information, which is composed of a plurality of pieces of medical care event information with different time instants of occurrence, is allocated to each node of the patient graph 20A. The value of the medical care event information varies with time. For example, the relevance/irrelevance of the medical care event varies with time. Time-of-occurrence information is allocated as meta-information to the medical care event information. The time-of-occurrence information is a time stamp of the medical care event information, and, for example, the date/time of diagnosis or the date/time of record of the medical care event is allocated to the time-of-occurrence information. For example, as illustrated in FIG. 24, medical care event information at time t, medical care event information at time t+1, and medical care event information at time t+2 are allocated to each node as the graph feature.

The processing circuitry 41 according to Applied Example 2 estimates the variation of the graph feature, based on the time-series graph feature.

FIG. 25 is a view illustrating a network architecture example of a machine learning model 60A according to Applied Example 2. As illustrated in FIG. 25, the machine learning model 60A includes a graph convolution layer 61, a readout layer 62 and an RNN (Recurrent Neural Network) layer 64. The RNN layer 64 outputs disease classification information 71 from time-series graph features 20C.

As illustrated in FIG. 25, it is assumed that process-targets are a patient graph 20A0 to which the graph feature of time t is allocated, a patient graph 20A1 to which the graph feature of time t+1 is allocated, and a patient graph 20A2 to which the graph feature of time t+2 is allocated. The processing circuitry 31 inputs the patient graph 20A0, patient graph 20A1 and patient graph 20A2 to the graph convolution layer 61, outputs a patient graph after convolution corresponding to the patient graph 20A0, a patient graph after convolution corresponding to the patient graph 20A1 and a patient graph after convolution corresponding to the patient graph 20A2, inputs the patient graphs after convolution to the readout layer 62, and outputs a feature vector 20C0 of time t, a feature vector 20C1 of time t+1 and a feature vector 20C2 of time t+2. The feature vector 20C0 is a vector expression of the graph feature of time t, the feature vector 20C1 is a vector expression of the graph feature of time t+1, and the feature vector 20C2 is a vector expression of the graph feature of time t+2.

As illustrated in FIG. 25, the processing circuitry 31 inputs the feature vector 20C0, feature vector 20C1 and feature vector 20C2 to the RNN layer 64, and outputs a single piece of disease classification information 71. By utilizing the RNN layer 64, it becomes possible to obtain the relevance probability of various diseases by utilizing the medical care event information of a plurality of serial time instants. The weight parameter of the RNN layer 64 is affected by the patient background information. Similarly to equation (9), the weight parameter $w_i$ of the RNN layer 64 can be expressed by a mathematical model including a coefficient, a node feature and a bias as elements.

In Applied Example 2, a temporal change of a patient background is incorporated in a component of variation. Time-series patient background information, which is composed of a plurality of pieces of patient background information at mutually different time instants of occurrence, is allocated to the patient background information according to Applied Example 2. Each patient background information includes patient background factors such as an age, a gender, BMI, and a medical history. As described above, elements with variation, among the elements involved in the machine learning model, include a node feature and an edge feature.

A computation example of the node feature according to Applied Example 2 is described. As illustrated in FIG. 14 and indicated in equation (8), the node feature $v_i$ is expressed by the sum of the product of the coefficient ($\alpha_v Z + \beta_v$) and the initial node feature $x_i$, and the bias $b_v$. In Applied Example 2, by replacing the patient background information Z of equation (8) with patient background information Z' indicated in equation (10) below, the node feature $v_i$ can be computed.

$$Z' = RNN(Z[t]) \qquad (10)$$

Various specific algorism for RNN(Z[t]) in equation (10) are possible, such as Elman network Jordan network, long short-term memory (LSTM), gated recurrent unit (GRU), etc.

Similarly, as regards the weight parameter $w_i$ of the RNN layer 64, which is expressed by equation (9), the weight parameter $w_i$ can be computed by replacing the patient background information Z of equation (9) with the patient background information Z' indicated in equation (10).

A computation example of the edge feature according to Applied Example 2 is described. As illustrated in FIG. 11 and indicated in equations (2) and (3), the processing circuitry 31 executes, based on the medical care event information of patients, a Granger causality test with respect to the edge connecting the medical care event x and the medical care event y, determines the weight $W_x$ and bias $b_x$, which are model parameters of the mathematical model that represents the edge feature of the edge, and determines the coefficient $\alpha_x$ that is the edge feature, based on the weight $W_x$ and bias $b_x$. In Applied Example 2, the weight $W_x$ and bias $b_x$ can be determined by replacing the patient background information Z of equation (3) with the patient background information Z' indicated in equation (10).

Applied Example 3

In Applied Example 2, it is assumed that the time-series graph feature is allocated to each node. In Applied Example 3, the patient graph itself varies in a time-series manner.

Processing circuitry 31 of a medical information learning apparatus 3 according to Applied Example 3 continues to obtain training samples (medical care information) with different time instants of occurrence, even after the trained model is once generated. As described above, the training sample is the combination of the medical care event information and the disease information. Based on the obtained pieces of medical care information, the processing circuitry 31 executes continuous learning for learning parameters of the machine learning model regularly or irregularly. By the continuous learning, time-series trained models with different time instants of occurrence are generated. Note that the learning parameters include an adjacency matrix and/or learning parameters of the machine learning model. Patient graphs before convolution at respective time instants are applied to the trained models at respective time instants, and patient graphs after convolution at respective time instants are generated. Thereby, time-series patient graphs, in which the graph feature of each node and the connection relation between the nodes vary in a time-series manner, can be generated.

The trained models at respective time instants of occurrence, which constitute the time-series trained models, are trained according to the processing procedure illustrated in FIG. 9, based on the training samples obtained up to the time instant of occurrence. At this time, in order to suppress a great change of characteristics of the patient graph before and after the update of the adjacency matrix A and/or weight parameter W, a regularization term may be provided in a loss function, as indicated in equations (11) and (12) below. Equation (11) is a regularization term $L_{reg}$ relating to the update of the adjacency matrix A, and is expressed by Kullback-Leibler divergence between an adjacency matrix A at a process reference time instant and an adjacency matrix A' at another time instant. Equation (12) is a regularization term $L_{reg}$ relating to the update of the weight parameter $W^{(1)}$, and is expressed by Kullback-Leibler divergence between a weight parameter $W^{(1)}$ at a process reference time instant and a weight parameter $W'^{(1)}$ at another time instant.

$$L_{reg}=D_{KL}(A\|A') \quad (11)$$

$$L_{reg}=D_{KL}(W^{(i)}\|W'^{(i)}) \quad (12)$$

Applied Example 4

In some embodiments described above, it is assumed that spatial information such as the local feature is allocated as the graph feature to each node of the patient graph. In Applied Example 4, a concept of space is added to the patient graph itself.

FIG. 26 is a view schematically illustrating a relationship between a patient graph and spatial information according to Applied Example 4. As illustrated in FIG. 26, spatial information relating to the target patient of each patient graph is allocated to the patient graph. The spatial information includes local information and biological information as elements of the spatial information. The local information may be sensor information of a GPS or the like which indicates the present position of the target patient, or may be the position of a medical institution where the target patient undergoes a medical examination, the address of the home of the target patient, or the position of a hospital room or the like where the target patient is hospitalized. The biological information includes the blood relationship, the medical history, and the gene arrangement of the target patient. By embedding the spatial information in the patient graph, it is possible to construct a network (hereinafter "patient graph network") in which a plurality of patient graphs are arranged in accordance with the presence/absence or the degree of the relation of the spatial information.

FIG. 27 is a view illustrating a concept of a patient graph network 200. As illustrated in FIG. 27, the patient graph network 200 is composed of a plurality of patient graphs that are connected in accordance with the presence/absence or the degree of the relation of the spatial information. FIG. 27 exemplarily illustrates four patient graphs 201, 202, 203 and 204, but the number of patient graphs is not specifically limited if the number is two or more.

A connection by an edge between patient graphs (for example, patient graph 201 and patient graph 202) means that these patient graphs have a relationship of spatial information. Conversely, non-connection by an edge between patient graphs (for example, patient graph 201 and patient graph 204) means that these patient graphs have no relationship of spatial information. In addition, the distance between patient graphs connected by an edge represents the degree of a relationship of spatial information. As regards the local information, the processing circuitry 31 can evaluate the degree of the relationship of the spatial information, for example, based on the distance between the addresses of the homes or the hospital rooms of both patients. As regards the biological information, the processing circuitry 31 can perform the evaluation, based on the degree of consanguinity of both patients, the medical relationship of the medical histories, and the ratio of coincidence of gene arrangements. The processing circuitry 31 can determine the presence/absence of the relationship of the spatial information, based on the comparison between the degree evaluated by the above method and a threshold. The edge may be formed based on the comprehensive evaluation of the above-described elements of the spatial information, or may be formed in regard to each of the above-described elements.

By allocating the spatial information to the patient graph, it is possible to easily search a patient graph whose spatial information is close to the patient graph of the target patient. In one example, the processing circuitry 31 can extract a patient graph, which is connected to the patient graph of the target patient by an edge, as the patient graph of a patient whose spatial information is close to the target patient.

Note that the spatial information is not limited to the spatial information including both the local information and the biological information, and may be spatial information including only one of the local information and the biological information.

Applied Example 5

In Applied Example 5, the spatial information according to Applied Example 4 is utilized. Processing circuitry 31 of a medical information processing apparatus 3 according to Applied Example 5 convolutes a graph feature of a patient graph of a patient, who is different from the target patient, into the patient graph of the target patient.

FIG. 28 is a view representing an outline of graph features according to Applied Example 5. As illustrated in FIG. 28, as the graph feature, medical care event information, such as a relevance/irrelevance feature, a temporal feature, a local feature and/or a spatial proximity patient feature, is allocated to each node of the patient graph 20B. The relevance/irrelevance feature, temporal feature and local feature are as described in Applied Example 1. The spatial proximity patient feature is medical care event information of another patient, whose spatial information is close to the target patient. For example, as well as the relevance/irrelevance feature, temporal feature and local feature of the target patient, the relevance/irrelevance feature, temporal feature and local feature of the father and/or mother of the target patient are allocated to the node of the medical care event "headache".

The processing circuitry 31 according to Applied Example 5 generates a patient graph 20A of the target patient by mapping the medical care event information according to Applied Example 5 on the medical knowledge graph. The medical care event information according to Applied Example 5 includes the relevance/irrelevance feature, temporal feature, local feature and spatial proximity patient feature in regard to each medical care event. The relevance/irrelevance feature, temporal feature and local feature are the medical care event information of the target patient. The spatial proximity patient feature is the medical care event information of another patient, whose spatial information is close to the target patient. Specifically, the processing circuitry 31 according to Applied Example 5 maps the medical care event information of the target patient and the medical care event information of the another patient on the nodes as node features of the nodes. By the mapping, the patient graph 20A is generated in which the relevance/irrelevance feature, temporal feature, local feature and spatial proximity patient feature are allocated to the nodes.

Thereafter, the processing circuitry 31 estimates the medical judgment information such as the disease classification information, by applying to the trained model 60 the patient graph including the nodes to which the relevance/irrelevance feature, temporal feature, local feature and spatial proximity patient feature are allocated. According to Applied Example 5, the medical judgment information can be estimated by taking into account the relevance/irrelevance feature, temporal feature, local feature and spatial proximity patient feature of each medical care event. Thereby, the medical judgment information can be estimated in which the medical care information (graph feature) of not only the target patient but also the patient whose spatial information is close to the target patient is taken into account. Note that it is not necessary that all of the relevance/irrelevance feature, temporal feature, local feature and spatial proximity patient feature be allocated to the nodes, but only two or one among these may be allocated.

Applied Example 6

In some embodiments described above, as regards the display of the visualization graph based on the patient graph, it is assumed that the processing circuitry 31 displays the visualization graph based on a partial patient graph including only the nodes and edges belonging to a part of all medical care event categories including the symptom, physical finding, examination finding, treatment, treatment reaction, and side effect. However, as illustrated in FIG. 2, the processing circuitry 31 may display the visualization graph based on the entirety of the patient graph over all medical care event categories. At this time, the processing circuitry 31 may display the visualization graph in which the respective categories can be distinguished by visual effects such as colors. Thereby, the entirety of the patient graph can be overlooked.

According to at least one of the above-described embodiments, the individual difference between patients can be visualized.

The term "processor" used in the above description means a CPU, a GPU, or circuitry such as an application specific integrated circuit (ASIC) and programmable logic devices (e.g. a simple programmable logic device (SPLD), a complex programmable logic device (CPLD) and a field programmable gate array (FPGA)). The processor implements a function by reading and executing a program stored in storage circuitry. Note that, instead of storing the program in the storage circuitry, a configuration may be adopted in which the program is directly embedded in the circuitry of the processor. In this case, the processor implements the function by reading and executing the program embedded in the circuitry of the processor. Furthermore, instead of executing the program, the function corresponding to the program may be implemented by a combination of logic circuits. Note that each of the processors of the embodiments may not be constituted as single circuitry for each processor, but a plurality of independent circuits may be combined to constitute one processor and may implement the function of the processor. Besides, the structural elements in FIG. 1, FIG. 5 and FIG. 17 may be integrated into one processor, and the processor may implement the functions of the structural elements.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A medical information processing apparatus comprising:
    a storage device configured to store a medical knowledge graph including nodes corresponding to medical care events, and edges indicative of a relationship between the nodes, a graph feature of the medical knowledge graph being expressed by a mathematical model characterized by patient background information, the graph feature including a kind of a node, a value of a node, a kind of an edge, and/or a value of an edge; and processing circuitry configured to obtain patient background information relating to a background factor of one or more target patients, configured to compute variation of the graph feature relating to the target patient, based on the patient background information of the target patient and the mathematical model, and configured to display the variation of the graph feature on a display device, wherein the variation of the graph feature is a correlation degree of the graph feature with the patient background information, and the processing circuitry is configured to compute the variation of the graph feature in such a manner that:

if the one or more target patients comprise a plurality of target patients, the processing circuitry computes the graph feature for each of the target patients based on the patient background information and the mathematical model and computes, as the variation of the graph feature, an index of dispersion of the graph features over the target patients, and if the one or more target patients comprise a single target patient, the processing circuitry computes the graph feature for the patient background information at each of a plurality of time points based on the patient background information and the mathematical model and computes, as the variation of the graph feature, an index of dispersion of the graph features over the time points, wherein the processing circuitry is configured to determine parameters of the mathematical model by inputting a patient graph, which includes a variation, to a machine learning model and output a determination result, the machine learning model having been trained using patient graphs and determination result labels in association with each other, wherein the machine learning model is a neural network that includes at least a convolution layer configured to receive the inputted patient graph, executes a graph convolution process that applies learned weight parameters to nodes of the patient graph, and outputs a post-convolution patient graph, a readout layer configured to convert the post-convolution patient graph to a feature vector having a same number of dimensions as a number of nodes in the post-convolution patient graph, and a dense layer configured to convert the feature vector into disease classification information as the determination result, the outputted determination result being a numerical value indicative of a probability of relevance to each of one or more relevant diseases.

2. The medical information processing apparatus of claim 1, wherein the processing circuitry displays a visualization graph that visualizes the medical knowledge graph, and displays the node and/or the edge included in the visualization graph in a display mode corresponding to the variation.

3. The medical information processing apparatus of claim 1, wherein the processing circuitry is configured to:

select a background factor of a display target in the patient background information; and display the variation of the graph feature relating to the selected background factor of the display target.

4. The medical information processing apparatus of claim 1, wherein the medical care events include an event belonging to at least one category among categories of a symptom, an examination, a treatment, a treatment reaction, and a side effect.

5. The medical information processing apparatus of claim 1, wherein the processing circuitry is configured to:

select a category of a display target of the medical care events; and extract, from the medical knowledge graph, a partial graph including nodes belonging to the category of the display target, and edges connecting the nodes, display a visualization graph that visualizes the partial graph, and display the nodes and/or the edges included in the visualization graph in a display mode corresponding to the variation.

6. The medical information processing apparatus of claim 1, wherein the graph feature of the medical knowledge graph is expressed by the mathematical model in which a model parameter is a variable, the model parameter is determined based on the patient background information.

7. The medical information processing apparatus of claim 1, wherein the medical knowledge graph is a graph generated based on medical care information of a plurality of patients or medical ontology.

8. The medical information processing apparatus of claim 1, wherein the storage device further stores a machine learning model that estimates medical judgment information from the medical knowledge graph, a learning parameter of the machine learning model being expressed by the mathematical model characterized by the patient background information, and the processing circuitry is configured to:

compute variation of the learning parameter relating to the target patient, based on the patient background information of the target patient, and the mathematical model; and display the variation of the learning parameter.

9. The medical information processing apparatus of claim 1, wherein the patient background information is time-series patient background information at mutually different time instants of occurrence, and the processing circuitry computes the variation of the graph feature relating to the target patient, based on the time-series patient background information of the target patient, and the mathematical model.

\* \* \* \* \*